(12) United States Patent
Oren et al.

(10) Patent No.: US 10,518,828 B2
(45) Date of Patent: Dec. 31, 2019

(54) TRAILER ASSEMBLY FOR TRANSPORT OF CONTAINERS OF PROPPANT MATERIAL

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days.

(21) Appl. No.: 15/602,666

(22) Filed: May 23, 2017

(65) Prior Publication Data

US 2017/0349226 A1   Dec. 7, 2017

Related U.S. Application Data

(60) Provisional application No. 62/345,295, filed on Jun. 3, 2016.

(51) Int. Cl.
*B62D 21/20* (2006.01)
*B62D 33/02* (2006.01)
(Continued)

(52) U.S. Cl.
CPC .............. *B62D 53/061* (2013.01); *B60S 9/02* (2013.01); *B62D 21/02* (2013.01); *B62D 21/20* (2013.01); *B62D 33/02* (2013.01)

(58) Field of Classification Search
CPC ...... B62D 53/061; B62D 33/02; B62D 21/02; B62D 21/20; B60S 9/02; B60P 1/52; B60P 1/56
(Continued)

(56) References Cited

U.S. PATENT DOCUMENTS

| 137,871 A | 4/1873 | Worsley |
| 150,894 A | 5/1874 | Safely |

(Continued)

FOREIGN PATENT DOCUMENTS

| CA | 2023138 | 2/1992 |
| CA | 2791088 | 3/2013 |

(Continued)

OTHER PUBLICATIONS

Non-Final Office Action dated Oct. 27, 2016 for co-pending U.S. Appl. No. 15/219,676.

(Continued)

*Primary Examiner* — Anne Marie M Boehler
(74) *Attorney, Agent, or Firm* — Lorenz & Kopf LLP

(57) ABSTRACT

Embodiments of the present disclosure include a trailer assembly for transporting a plurality of proppant containers along a roadway, and associated methods. The trailer assembly includes a skeletal frame having open areas between structural components to enhance weight reduction of the frame, and first, second, third, and connector sections. Additionally, the frame includes a pair of spaced-apart side rails and three or more wheel and axle assemblies to facilitate movement of the trailer assembly. The trailer assembly includes a first pair of outriggers coupled to and arranged transverse the pair of side rails, and a second pair of outriggers arranged proximate the first pair of outriggers. The outriggers have a coupling element positioned at each distal end to engage and secure a proppant container of the plurality of proppant containers to the trailer assembly. Each distal end is positioned to extend outwardly from an axis of the trailer.

8 Claims, 9 Drawing Sheets

(51) Int. Cl.
*B62D 53/06* (2006.01)
*B60S 9/02* (2006.01)
*B62D 21/02* (2006.01)

(58) Field of Classification Search
USPC .... 280/837, 839, 423.1, 475, 789, 107, 792, 280/798, 796, 791, 790; 410/82, 83, 56, 410/68
See application file for complete search history.

(56) References Cited

U.S. PATENT DOCUMENTS

| | | | |
|---|---|---|---|
| 384,443 A | 6/1888 | Hoover | |
| 448,238 A | 3/1891 | Johnson | |
| 710,611 A | 10/1902 | Ray | |
| 711,632 A | 10/1902 | Johnson | |
| 917,649 A | 4/1909 | Otto | |
| 1,143,641 A | 6/1915 | McGregor | |
| 1,331,883 A | 2/1920 | Stuart | |
| 1,344,768 A | 6/1920 | Messiter | |
| 1,434,488 A | 11/1922 | Forsythe et al. | |
| 1,520,560 A | 12/1923 | Burno | |
| 1,506,936 A | 9/1924 | Lea | |
| 1,526,527 A | 2/1925 | Butler | |
| 1,573,664 A | 2/1926 | Wetherill | |
| 1,807,447 A | 5/1931 | Smith | |
| 1,850,000 A | 3/1932 | Fernand | |
| 1,932,320 A | 10/1933 | Steward | |
| 1,973,312 A | 9/1934 | Hardinge | |
| 2,020,628 A | 11/1935 | Woodruff | |
| 2,233,005 A | 2/1941 | Garlinghouse | |
| 2,255,448 A | 9/1941 | Morris | |
| 2,293,160 A | 8/1942 | Miller et al. | |
| 2,368,672 A | 2/1945 | McNamara | |
| 2,381,103 A | 8/1945 | Frank | |
| 2,385,245 A | 9/1945 | Willoughby | |
| 2,413,661 A | 12/1946 | Stokes | |
| 2,423,879 A | 7/1947 | De Frees | |
| 2,563,470 A | 8/1951 | Kane | |
| 2,564,020 A | 8/1951 | Mengel | |
| 2,603,342 A | 7/1952 | Martinson | |
| 2,616,758 A | 11/1952 | Meyers | |
| 2,622,771 A | 12/1952 | Tulou | |
| 2,652,174 A | 9/1953 | Shea et al. | |
| 2,670,866 A | 3/1954 | Glesby | |
| 2,678,145 A | 5/1954 | Ejuzwiak et al. | |
| 2,693,282 A | 11/1954 | Sensibar | |
| 2,700,574 A | 1/1955 | Tourneau | |
| 2,792,262 A | 4/1955 | Hathorn | |
| 2,774,515 A | 12/1956 | Johansson et al. | |
| 2,791,973 A | 5/1957 | Dorey | |
| 2,801,125 A | 7/1957 | Page et al. | |
| 2,808,164 A | 10/1957 | Glendinning | |
| 2,812,970 A | 11/1957 | Martinson | |
| 2,837,369 A | 6/1958 | Stopps | |
| 2,865,521 A | 12/1958 | Fisher et al. | |
| 2,873,036 A | 2/1959 | Noble | |
| 2,894,666 A | 7/1959 | Campbell, Jr. | |
| 2,988,235 A | 6/1961 | Ronyak | |
| 2,994,460 A | 8/1961 | Matthews | |
| 3,041,113 A | 6/1962 | Sackett | |
| 3,049,248 A | 8/1962 | Heltzel et al. | |
| 3,064,832 A | 11/1962 | Heltzel | |
| 3,083,879 A | 4/1963 | Coleman | |
| 3,090,527 A | 5/1963 | Rensch | |
| 3,109,389 A | 11/1963 | Karlsson | |
| 3,122,258 A | 2/1964 | Raymond | |
| 3,134,606 A | 5/1964 | Oyler | |
| 3,135,432 A | 6/1964 | McKinney | |
| 3,163,127 A | 12/1964 | Gutridge et al. | |
| 3,187,684 A | 6/1965 | Ortner | |
| 3,198,494 A | 8/1965 | Curran et al. | |
| 3,199,585 A | 8/1965 | Cronberger | |
| 3,248,026 A | 4/1966 | Kemp | |
| 3,255,927 A | 6/1966 | Ruppert et al. | |
| 3,265,443 A | 8/1966 | Simas | |
| 3,270,921 A | 9/1966 | Nadolske et al. | |
| 3,281,006 A | 10/1966 | Tonchung | |
| 3,294,306 A | 12/1966 | Areddy | |
| 3,318,473 A | 5/1967 | Jones et al. | |
| 3,326,572 A | 6/1967 | Murray | |
| 3,343,688 A | 9/1967 | Ross | |
| 3,353,599 A | 11/1967 | Swift | |
| 3,354,918 A | 11/1967 | Coleman | |
| 3,378,152 A | 4/1968 | Warner | |
| 3,387,570 A | 6/1968 | Pulcrano et al. | |
| 3,396,675 A | 8/1968 | Stevens | |
| 3,397,654 A | 8/1968 | Snyder | |
| 3,406,995 A | 10/1968 | McCarthy | |
| 3,407,971 A | 10/1968 | Oehler | |
| 3,425,599 A | 2/1969 | Sammarco et al. | |
| 3,455,474 A | 7/1969 | Truncali | |
| 3,476,270 A | 11/1969 | Cox et al. | |
| 3,486,787 A * | 12/1969 | Campbell | B60P 7/132 410/80 |
| 3,499,694 A | 3/1970 | Coppel | |
| 3,508,762 A | 4/1970 | Pratt | |
| 3,524,567 A | 8/1970 | Coleman | |
| 3,528,570 A | 9/1970 | Pase | |
| 3,561,633 A | 2/1971 | Morrison et al. | |
| 3,587,834 A | 6/1971 | Dugge | |
| 3,596,609 A | 8/1971 | Ortner | |
| 3,601,244 A | 8/1971 | Ort et al. | |
| 3,602,400 A | 8/1971 | Cooke | |
| 3,650,567 A | 3/1972 | Danielson | |
| 3,653,521 A | 4/1972 | Bridge | |
| 3,661,293 A | 5/1972 | Gerhard et al. | |
| 3,692,363 A | 9/1972 | Tenebaum et al. | |
| 3,704,797 A | 12/1972 | Suykens | |
| 3,721,199 A | 3/1973 | Hassenauer | |
| 3,729,121 A | 4/1973 | Cannon | |
| 3,734,215 A | 5/1973 | Smith | |
| 3,738,511 A | 6/1973 | Lemon et al. | |
| 3,752,511 A | 8/1973 | Racy | |
| 3,777,909 A | 12/1973 | Rheinfrank | |
| 3,785,534 A | 1/1974 | Smith | |
| 3,800,712 A | 4/1974 | Krug, Jr. | |
| 3,802,584 A | 4/1974 | Sackett | |
| 3,817,261 A | 6/1974 | Rogge | |
| 3,820,762 A | 6/1974 | Bostrom et al. | |
| 3,827,578 A | 8/1974 | Hough | |
| 3,840,141 A | 10/1974 | Allom et al. | |
| 3,854,612 A | 12/1974 | Snape | |
| 3,861,716 A | 1/1975 | Baxter et al. | |
| 3,883,005 A | 5/1975 | Stevens | |
| 3,904,105 A | 9/1975 | Booth | |
| 3,909,223 A | 9/1975 | Schmidt | |
| 3,913,933 A * | 10/1975 | Visser | B60P 3/40 280/656 |
| 3,933,100 A | 1/1976 | Dugge | |
| 3,963,149 A | 6/1976 | Fassauer | |
| 3,970,123 A | 7/1976 | Poulton et al. | |
| 3,986,708 A | 10/1976 | Heltzel et al. | |
| 3,997,089 A | 12/1976 | Clarke et al. | |
| 3,999,290 A | 12/1976 | Wood | |
| 4,003,301 A | 1/1977 | Norton | |
| 4,004,700 A | 1/1977 | Empey | |
| 4,019,635 A | 4/1977 | Boots | |
| 4,057,153 A | 11/1977 | Weaver | |
| 4,058,239 A | 11/1977 | Van Mill | |
| 4,063,656 A | 12/1977 | Lambert | |
| 4,073,410 A | 2/1978 | Melcher | |
| 4,125,195 A | 11/1978 | Sasadi | |
| 4,138,163 A | 2/1979 | Calvert et al. | |
| 4,178,117 A | 12/1979 | Brugler | |
| 4,204,773 A | 5/1980 | Bates | |
| 4,210,273 A | 7/1980 | Hegele | |
| 4,210,963 A | 7/1980 | Ricciardi et al. | |
| RE30,358 E | 8/1980 | Sensibar | |
| 4,222,498 A | 9/1980 | Brock | |
| 4,227,732 A | 10/1980 | Kish | |
| 4,232,884 A | 11/1980 | Dewitt | |
| 4,239,424 A | 12/1980 | Pavolka | |
| 4,245,820 A | 1/1981 | Muryn | |

(56) References Cited

U.S. PATENT DOCUMENTS

| | | | |
|---|---|---|---|
| 4,247,228 | A | 1/1981 | Gray et al. |
| 4,247,370 | A | 1/1981 | Nijhawan et al. |
| 4,258,953 | A | 3/1981 | Johnson |
| 4,265,266 | A | 5/1981 | Kierbow et al. |
| 4,278,190 | A | 7/1981 | Oory et al. |
| 4,280,640 | A | 7/1981 | Daloisio |
| 4,282,988 | A | 8/1981 | Hulbert, Jr. |
| 4,287,921 | A | 9/1981 | Sanford |
| 4,287,997 | A | 9/1981 | Rolfe et al. |
| 4,289,353 | A | 9/1981 | Merritt |
| 4,299,597 | A | 11/1981 | Oetiker et al. |
| 4,306,895 | A | 12/1981 | Thompson et al. |
| 4,329,106 | A | 5/1982 | Adler |
| 4,350,241 | A | 9/1982 | Wenzel |
| 4,359,176 | A | 11/1982 | Johnson |
| 4,363,396 | A | 12/1982 | Wolf et al. |
| 4,395,052 | A * | 7/1983 | Rash .................. B60P 3/2215 250/506.1 |
| 4,397,406 | A | 8/1983 | Croley |
| 4,398,653 | A | 8/1983 | Daloisio |
| 4,402,392 | A | 9/1983 | Fabian et al. |
| 4,407,202 | A | 10/1983 | McCormick |
| 4,408,886 | A | 10/1983 | Sampson et al. |
| 4,410,106 | A | 10/1983 | Kierbow et al. |
| 4,420,285 | A | 12/1983 | Loyer et al. |
| 4,427,133 | A | 1/1984 | Kierbow et al. |
| 4,428,504 | A | 1/1984 | Bassett et al. |
| 4,449,861 | A | 5/1984 | Saito |
| 4,453,645 | A | 6/1984 | Usui et al. |
| 4,474,204 | A | 10/1984 | West |
| 4,475,672 | A | 10/1984 | Whitehead |
| 4,478,155 | A | 10/1984 | Cena et al. |
| 4,483,462 | A | 11/1984 | Heintz |
| 4,513,755 | A | 4/1985 | Baroni |
| 4,525,071 | A | 6/1985 | Horowitz |
| 4,526,353 | A | 7/1985 | Stomp |
| 4,532,098 | A | 7/1985 | Campbell |
| 4,534,869 | A | 8/1985 | Seibert |
| 4,552,573 | A | 11/1985 | Weis |
| 4,569,394 | A | 2/1986 | Sweatman et al. |
| 4,570,967 | A * | 2/1986 | Allnutt .................. B62D 21/14 280/656 |
| 4,571,143 | A | 2/1986 | Hellerich |
| 4,588,605 | A | 5/1986 | Frei et al. |
| 4,608,931 | A | 9/1986 | Ruhmann et al. |
| 4,619,531 | A | 10/1986 | Dunstan |
| 4,624,729 | A | 11/1986 | Bresciani et al. |
| 4,626,155 | A | 12/1986 | Hlinsky et al. |
| 4,626,166 | A | 12/1986 | Jolly |
| 4,628,825 | A | 12/1986 | Taylor et al. |
| 4,639,015 | A * | 1/1987 | Pitts .................. B62D 53/067 280/433 |
| 4,648,584 | A | 3/1987 | Wamser |
| 4,660,733 | A | 4/1987 | Snyder et al. |
| 4,701,095 | A | 10/1987 | Berryman et al. |
| 4,714,010 | A | 12/1987 | Smart |
| 4,715,754 | A | 12/1987 | Scully |
| 4,724,976 | A | 2/1988 | Lee |
| 4,738,774 | A | 4/1988 | Patrick |
| 4,741,273 | A | 5/1988 | Sherwood |
| 4,761,039 | A | 8/1988 | Hilaris |
| 4,779,751 | A | 10/1988 | Munroe |
| 4,798,039 | A | 1/1989 | Deglise |
| 4,801,389 | A | 1/1989 | Brannon et al. |
| 4,819,830 | A | 4/1989 | Schultz |
| 4,836,510 | A | 6/1989 | Weber et al. |
| 4,836,735 | A | 6/1989 | Dennehy |
| 4,848,605 | A | 7/1989 | Wise |
| 4,882,784 | A | 11/1989 | Tump |
| 4,889,219 | A | 12/1989 | Key |
| 4,901,649 | A | 2/1990 | Fehrenbach et al. |
| 4,909,378 | A | 3/1990 | Webb |
| 4,909,556 | A | 3/1990 | Koskinen |
| 4,917,019 | A | 4/1990 | Hesch et al. |
| 4,919,583 | A | 4/1990 | Speakman, Jr. |
| 4,923,358 | A | 5/1990 | Van Mill |
| 4,946,068 | A | 8/1990 | Erickson et al. |
| 4,947,760 | A | 8/1990 | Dawson et al. |
| 4,949,714 | A | 8/1990 | Orr |
| 4,954,975 | A | 9/1990 | Kalata |
| 4,956,821 | A | 9/1990 | Fenelon |
| 4,964,243 | A | 10/1990 | Reiter |
| 4,975,205 | A | 12/1990 | Sloan |
| 4,975,305 | A | 12/1990 | Biginelli |
| 4,988,115 | A | 1/1991 | Steinke |
| 4,995,522 | A | 2/1991 | Barr |
| 5,004,400 | A | 4/1991 | Handke |
| 5,028,002 | A | 7/1991 | Whitford |
| 5,036,979 | A | 8/1991 | Selz |
| 5,042,538 | A | 8/1991 | Wiese |
| 5,069,352 | A | 12/1991 | Harbolt et al. |
| 5,080,259 | A | 1/1992 | Hadley |
| 5,082,304 | A | 1/1992 | Preller |
| 5,102,281 | A | 4/1992 | Handke |
| 5,102,286 | A | 4/1992 | Fenton |
| 5,105,858 | A | 4/1992 | Levinson |
| 5,131,524 | A | 7/1992 | Uehara |
| 5,167,719 | A | 12/1992 | Tamaki |
| 5,190,182 | A | 3/1993 | Copas et al. |
| 5,195,861 | A | 3/1993 | Handke |
| 5,199,826 | A | 4/1993 | Lawrence |
| 5,201,546 | A | 4/1993 | Lindsay |
| 5,224,635 | A | 7/1993 | Wise |
| 5,253,746 | A | 10/1993 | Friesen et al. |
| 5,253,776 | A | 10/1993 | Decroix et al. |
| 5,265,763 | A | 11/1993 | Heinrici et al. |
| 5,277,014 | A | 1/1994 | White |
| 5,280,883 | A | 1/1994 | Ibar |
| 5,286,158 | A | 2/1994 | Zimmerman |
| 5,286,294 | A | 2/1994 | Ebi et al. |
| 5,290,139 | A | 3/1994 | Hedrick |
| 5,317,783 | A | 6/1994 | Williamson |
| 5,320,046 | A | 6/1994 | Hesch |
| 5,324,097 | A | 6/1994 | DeCap |
| 5,339,996 | A | 8/1994 | Dubbert |
| 5,345,982 | A | 9/1994 | Nadeau et al. |
| 5,358,137 | A | 10/1994 | Shuert et al. |
| 5,373,792 | A | 12/1994 | Pileggi et al. |
| 5,392,946 | A | 2/1995 | Holbrook et al. |
| 5,402,915 | A | 4/1995 | Hogan |
| 5,413,154 | A | 5/1995 | Hurst et al. |
| 5,429,259 | A | 7/1995 | Robin |
| 5,441,321 | A | 8/1995 | Karpisek |
| 5,465,829 | A | 11/1995 | Kruse |
| 5,470,175 | A | 11/1995 | Jensen et al. |
| 5,470,176 | A | 11/1995 | Corcoran et al. |
| 5,493,852 | A | 2/1996 | Stewart |
| 5,498,119 | A | 3/1996 | Faivre |
| 5,507,514 | A | 4/1996 | Jacques |
| 5,538,286 | A | 7/1996 | Hoff |
| 5,549,278 | A | 8/1996 | Sidler |
| 5,564,599 | A | 10/1996 | Barber et al. |
| 5,570,743 | A | 11/1996 | Padgett et al. |
| 5,590,976 | A | 1/1997 | Kilheffer et al. |
| 5,601,181 | A | 2/1997 | Lindhorst |
| 5,602,761 | A | 2/1997 | Spoerre et al. |
| 5,613,446 | A | 3/1997 | DiLuigi et al. |
| 5,617,974 | A | 4/1997 | Sawyer |
| 5,647,514 | A | 7/1997 | Toth et al. |
| RE35,580 | E | 8/1997 | Heider et al. |
| 5,667,298 | A | 9/1997 | Musil |
| 5,687,881 | A | 11/1997 | Rouse et al. |
| 5,690,466 | A | 11/1997 | Gaddis et al. |
| 5,697,535 | A | 12/1997 | Coleman |
| 5,706,614 | A | 1/1998 | Wiley et al. |
| 5,718,555 | A | 2/1998 | Swalheim |
| 5,722,552 | A | 3/1998 | Olson |
| 5,722,688 | A | 3/1998 | Garcia |
| 5,746,258 | A | 5/1998 | Huck |
| 5,761,854 | A | 6/1998 | Johnson et al. |
| 5,762,222 | A | 6/1998 | Liu |
| 5,772,390 | A | 6/1998 | Walker |
| 5,782,524 | A | 7/1998 | Heider et al. |
| 5,785,421 | A | 7/1998 | Milek |

(56) References Cited

U.S. PATENT DOCUMENTS

| | | |
|---|---|---|
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,878,903 A | 3/1999 | Ung |
| 5,906,471 A | 5/1999 | Schwoerer |
| 5,911,337 A | 6/1999 | Bedeker |
| 5,924,829 A * | 7/1999 | Hastings ............ B62D 53/061 280/DIG. 8 |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 * | 4/2001 | Crosby ............... B60P 7/132 410/35 |
| 6,231,284 B1 | 5/2001 | Kordel |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,450,522 B1 | 9/2002 | Yamada et al. |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 * | 5/2003 | Stobart ............... B60P 3/222 105/358 |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 | 1/2004 | Moshgbar |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,213 B1 | 8/2011 | Gauthier et al. |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| 8,469,065 B2 | 6/2013 | Schroeder et al. |
| D688,351 S | 8/2013 | Oren |
| 8,505,780 B2 | 8/2013 | Oren |
| 8,544,419 B1 | 10/2013 | Spalding et al. |
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |
| 8,662,525 B1 * | 3/2014 | Dierks ............... B62B 1/00 280/142 |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |

(56) References Cited

U.S. PATENT DOCUMENTS

| | | |
|---|---|---|
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 9,796,318 B1 | 10/2017 | Nolasco |
| 2001/0022308 A1 | 9/2001 | Epp et al. |
| 2001/0038777 A1 | 11/2001 | Cassell |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0024971 A1 | 2/2003 | Jones |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0038242 A1 | 2/2009 | Cope |
| 2009/0078410 A1 | 3/2009 | Krenek et al. |
| 2009/0223143 A1 | 9/2009 | Esposito |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0072308 A1 | 3/2010 | Hermann et al. |
| 2010/0080681 A1* | 4/2010 | Bain .................. B60P 7/132 414/800 |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1* | 3/2014 | Harrell .................. B60P 3/2205 280/837 |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0202590 A1 | 7/2014 | Higgins |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1* | 10/2014 | Krenek .................. E21B 43/267 414/21 |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1 | 3/2015 | Stefan |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1* | 4/2015 | Thiessen ............... B60P 3/2295 280/837 |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |
| 2017/0217353 A1 | 8/2017 | Vander Pol |
| 2018/0009401 A1 | 1/2018 | Miller et al. |

FOREIGN PATENT DOCUMENTS

| | | |
|---|---|---|
| CN | 2037354 | 5/1989 |
| CN | 2059909 | 8/1990 |
| CN | 2075632 | 4/1991 |
| CN | 1329562 | 1/2002 |
| CN | 2517684 | 10/2002 |
| CN | 1635965 | 7/2005 |
| CN | 2913250 | 6/2007 |
| CN | 201161588 | 12/2008 |
| CN | 201390486 | 1/2010 |
| CN | 101823630 | 9/2010 |

(56) References Cited

FOREIGN PATENT DOCUMENTS

| | | |
|---|---|---|
| CN | 102101595 | 6/2011 |
| CN | 201881469 | 6/2011 |
| CN | 102114985 | 7/2011 |
| CN | 203033469 | 7/2013 |
| CN | 103350017 | 10/2013 |
| CN | 203580948 | 5/2014 |
| DE | 3108121 | 9/1982 |
| DE | 3342281 | 6/1985 |
| DE | 4008147 | 9/1990 |
| DE | 4217329 | 5/1993 |
| DE | 20317967 | 3/2004 |
| EP | 0016977 | 10/1980 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1598288 | 11/2005 |
| EP | 1775190 | 4/2007 |
| EP | 1795467 | 6/2007 |
| EP | 2062832 | 5/2009 |
| EP | 2311757 | 4/2011 |
| FR | 2173445 | 10/1973 |
| FR | 2640598 | 6/1990 |
| GB | 1000621 | 8/1965 |
| GB | 1296736 | 11/1972 |
| GB | 1333976 | 10/1973 |
| GB | 2066220 | 7/1981 |
| GB | 2204847 | 11/1988 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| JP | 11034729 | 2/1999 |
| JP | 2007084151 | 4/2007 |
| MX | 2012011046 | 10/2013 |
| NL | 8105283 | 6/1983 |
| WO | 1990008082 | 7/1990 |
| WO | 1992002437 | 2/1992 |
| WO | 1993001997 | 2/1993 |
| WO | 1993006031 | 4/1993 |
| WO | 1996025302 | 8/1996 |
| WO | 2003024815 | 3/2003 |
| WO | 2006039757 | 4/2006 |
| WO | 2007005054 | 1/2007 |
| WO | 2007057398 | 5/2007 |
| WO | 2007061310 | 5/2007 |
| WO | 2008012513 | 1/2008 |
| WO | 2009087338 | 7/2009 |
| WO | 2010026235 | 3/2010 |
| WO | 2011099358 | 8/2011 |
| WO | 2012021447 | 2/2012 |
| WO | 2012058059 | 3/2012 |

OTHER PUBLICATIONS

Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Feb. 24, 2017 for co-pending U.S. Appl. No. 14/943,182.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Apr. 3, 2017 for co-pending U.S. Appl. No. 13/555,635.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.

(56) References Cited

OTHER PUBLICATIONS

Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.

International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2011.
SandBox Logistics, LLC, screenshots from video made in Apr. 2013 and publicly shown in May 2013, Arnegard, North Dakota.
International Search Report for PCT/US15/35635, dated Oct. 30, 2015. (12 pages).
PCT International Search Report for PCT/US15/49074, dated Dec. 17, 2015. (11 pages).
PCT International Search Report for PCT/US15/57601, dated May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2011.
SandBox Logistics, LLC, screenshots from video dated Apr. 10, 2011.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.

(56) References Cited

OTHER PUBLICATIONS

Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
International Search Report and Written Opinion for PCT/US17/34603 dated Aug. 22, 2017.
Non-Final Office Action dated Aug. 30, 2017 for co-pending U.S. Appl. No. 14/943,182.
Non-Final Office Action dated Aug. 4, 2017 for co-pending U.S. Appl. No. 13/625,675.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Wafford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al v. Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
Final Office Action dated Oct. 13, 2017 for co-pending U.S. Appl. No. 15/398,950.
Non-Final Office Action dated Sep. 21, 2017 for co-pending U.S. Appl. No. 15/413,822.
Non-Final Office Action dated Oct. 5, 2017 for co-pending U.S. Appl. No. 14/848,447.
Final Office Action dated Sep. 21, 2017 for co-pending U.S. Appl. No. 14/922,836.
Non-Final Office Action dated Sep. 27, 2017 for co-pending U.S. Appl. No. 14/996,362.
Non-Final Office Action dated Sep. 28, 2017 for co-pending U.S. Appl. No. 13/628,702.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4pages).
WW Trailers Inc., Model GN204S9A datasheet, Portland, OR, Jan. 2007 (4pages).
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Itsumi Nagahama, English translation of Japan Unexamined Application No. S4871029, Dec. 14, 1971.
Non-Final Office Action dated Apr. 26, 2018 for co-pending U.S. Appl. No. 15/616,783.
Final Office Action dated Apr. 23, 2018 for co-pending U.S. Appl. No. 14/848,447.
Final Office Action dated Mar. 16, 2018 for co-pending U.S. Appl. No. 14/996,362.
Final Office Action dated Mar. 14, 2018 for co-pending U.S. Appl. No. 15/144,450.
International Organization for Standardization, ISO 668:1995(E).
International Organization for Standardization, ISO 668:1995(E)/Amd.1:2005(E).
International Organization for Standardization, ISO 668:1995(E)/Amd.2:2005(E).
International Organization for Standardization, ISO 1496-1:1990/Amd.1:1993(E).
International Organization for Standardization, ISO 1496-1:1990/Amd.2:1998(E).
International Organization for Standardization, ISO 1496-1:1990/Amd.3:2005(E).
International Organization for Standardization, ISO 1496-1:1990/Amd.4:2006(E).
International Organization for Standardization, ISO 1496-1:1990/Amd.5:2006(E).
Rastikian, K. et al., Modelling of sugar drying in a countercurrent cascading rotary dryer from stationary profiles of temperature and moisture, Journal of Food Engineering 41 (1999).

(56) References Cited

OTHER PUBLICATIONS

ISO 1496-1: International Standard, Series 1 Freight Containers—Specification and Testing—Part 1, General Cargo Containers, Fifth Edition, Aug. 15, 1990.

ISO 6346: International Standard, Freight Containers—Coding, Identification and Marking, Third Edition, Dec. 1, 1995.

ISO/IEC 15416: International Standard, Information Technology—Automatic Identification and Data Capture Techniques—Bar Code Print Quality Test Specification—Linear Symbols, First Edition, Aug. 15, 2000.

Noel, Lester A., Giuliano, Genevieve and Meyer, Michael D., Portions of Intermodal Transportation: Moving Freight in a Global Economy, Copyright Eno Transportation Foundation, 2011.

Smith, Ryan E., Prefab Architecture, A Guide to Modular Design and Construction, John Wiley & Sons, Inc., 2010.

OSHA-NIOSH, Hazard Alert: Worker Exposure to Silica during Hydraulic Fracturing, Jun. 2012.

Tremoglie, Michael P., Legal NewsLine, OSHA, NIOSH issue fracking health alert (/stories/510527440-oshaniosh-issue-fracking-health-alert), Jun. 25, 2012.

Beckwith, Robin, Proppants: Where in the World, Journal of Petroleum Technology, Apr. 2011.

Final Office Action dated Feb. 27, 2018 for co-pending U.S. Appl. No. 15/143,942.

Final Office Action dated Jan. 22, 2018 for co-pending U.S. Appl. No. 13/628,702.

Final Office Action dated Dec. 27, 2017 for co-pending U.S. Appl. No. 14/943,182.

Final Office Action dated Feb. 6, 2018 for co-pending U.S. Appl. No. 15/475,354.

Non-Final Office Action dated Feb. 9, 2018 for co-pending U.S. Appl. No. 15/587,926.

Non-Final Office Action dated Feb. 15, 2018 for co-pending U.S. Appl. No. 14/922,836.

* cited by examiner

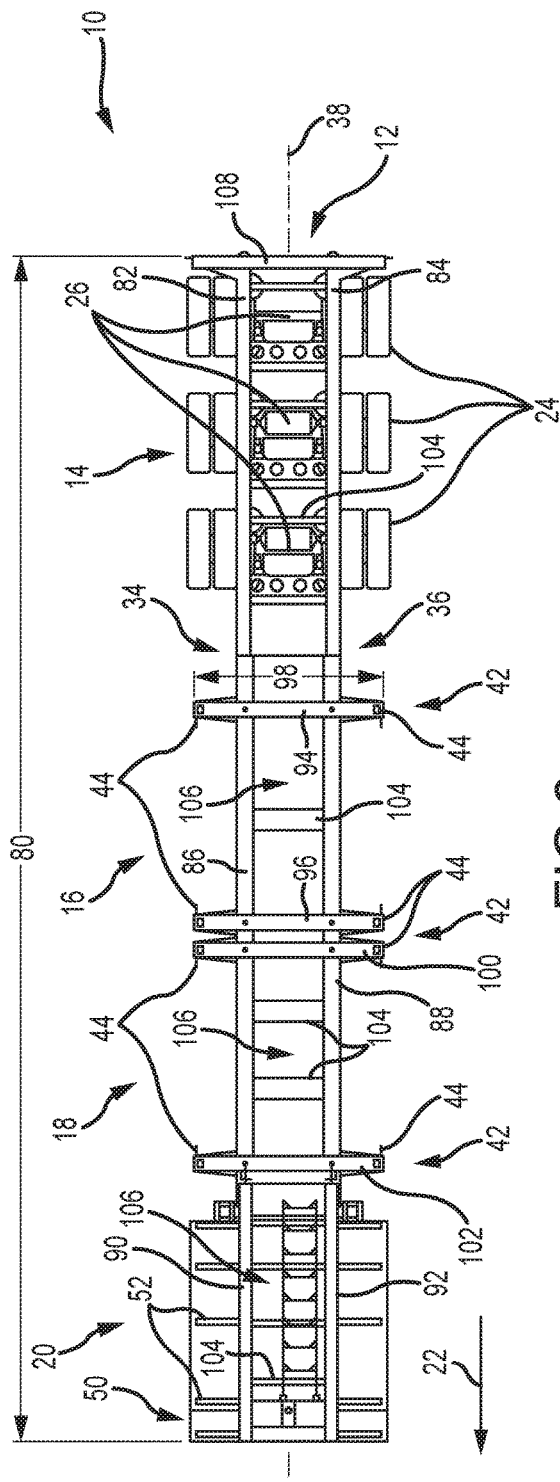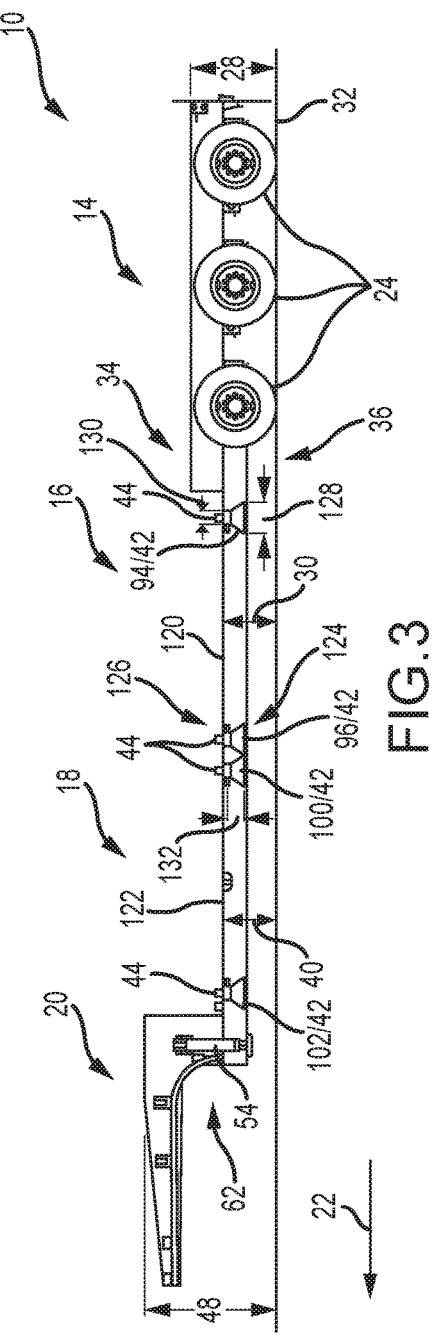

TRAILER ASSEMBLY FOR TRANSPORT OF CONTAINERS OF PROPPANT MATERIAL

RELATED APPLICATIONS

This application claims priority to, and the benefit of, U.S. Provisional Application No. 62/345,295, filed Jun. 3, 2016, titled "Trailer Assembly for Transport of Containers of Proppant Material," which is hereby incorporated by reference in its entirety.

BACKGROUND

Field of the Invention

The present disclosure relates to container trailer assemblies. Additionally, the present disclosure relates to systems and methods for transporting proppant material. More particularly, the present invention relates to a trailer assembly that is particularly suitable for the transport of containers of proppant material, and associated methods.

Description of Related Art

Hydraulic fracturing or "fracking" has been used for decades to stimulate production from conventional oil and gas wells. In recent years, the use of fracking has increased due to the development of new drilling technology such as horizontal drilling and multi-stage fracking. Such techniques reach previously-unavailable deposits of natural gas and oil. Fracking generally includes pumping fluid into a wellbore at high pressure. Inside the wellbore, the fluid is forced into the formation being produced. When the fluid enters the formation the fluid fractures, or creates fissures, in the formation. Water, as well as other fluids, and some solid proppants, are then pumped into the fissures to stimulate the release of oil and gas from the formation.

By far the dominant proppant is silica sand, made up of ancient weathered quartz, the most common mineral in the Earth's continental crust. Unlike common sand, which often feels gritty when rubbed between your fingers, sand used as a proppant tends to roll to the touch as a result of its round, spherical shape and tightly-graded particle distribution. Sand quality is a function of both deposit and processing. Furthermore, certain types of proppant are formed from coated sand and/or man-made material, such as ceramics. Grain size is critical, as any given proppant should reliably fall within certain mesh ranges, subject to downhole conditions and completion design. Generally, coarser proppant allows a higher capacity due to the larger pore spaces between grains. This type of proppant, however, may break down or crush more readily under stress due to the relatively fewer grain-to-grain contact points to bear the stress often incurred in deep oil- and gas-bearing formations.

Typically, in hydraulic fracturing operations, large amounts of proppant are utilized. As such, large amounts of proppant are transported to well sites, presenting significant logistical issues and difficulties. For example, often government regulations limit an amount of weight that may be transported on a road, such as on a highway or over a bridge, to avoid damage to the structural integrity of the road. Moreover, there may be height limitations (e.g., 4 meters, 5 meters, 6 meters, or the like) for transport vehicles and their associated loads, for example, to pass under bridges or through toll plazas. Furthermore, challenges are presented relating to the safe transportation of large quantities of material. For example, proppant may shift during transportation, causing stability and turning concerns. Accordingly, it is now recognized that it is desirable to develop systems and methods to transport large quantities of proppant.

SUMMARY

Applicants recognized the problems noted above herein and conceived and developed embodiments of systems and methods, according to the present disclosure, to transport proppant containers.

In an embodiment a trailer assembly for transporting a plurality of proppant containers along a roadway includes a frame having a skeletal structure to support the plurality of proppant containers in a side-by-side arrangement. The frame can include a first section arranged at a rearward end of the trailer assembly, relative to a direction of travel of the trailer assembly; a connector section to connect the trailer to a vehicle; a second section positioned between the first section and the connector section. The second section can have a first pair of outriggers, and a first section elevation can be greater than a second section elevation, relative to a ground plane, so as to enable distribution and stability of a load of the plurality of proppant containers when substantially filled with proppant and positioned on the lower-elevated second section. The frame can also include a third section positioned between the second section and the connector section, the third section having a second pair of outriggers, and open areas positioned between structural components to enhance weight reduction of the frame. In certain embodiments, the frame includes a pair of spaced-apart side rails, the pair of side rails being substantially parallel to one another, structurally strengthened to support and stabilize the plurality of proppant containers when substantially filled with proppant and positioned thereon, and arranged to extend along at least a portion of a length of the frame so as to distribute the load applied to the frame. The frame also includes three or more wheel and axle assemblies positioned proximate the first section, each wheel and axle assembly including a plurality of wheels rotatably connected to each axle to facilitate movement of the trailer assembly. The wheel and axle assemblies are positioned rearward of the load, relative to the direction of travel of the trailer assembly, to enable distribution and stability of the load along the length of the frame. Additionally, the connector section can be positioned at a front end of the frame and can include a vehicle coupling element to facilitate connection being made between the trailer assembly and a work vehicle. The first pair of outriggers can be connected to and arranged transverse the pair of side rails. Each of the first pair of outriggers have a distal end positioned to extend outwardly from an axis of the trailer such that each distal end of the first pair of outriggers extends wider than the pair of side rails. The second pair of outriggers can be arranged proximate the first pair of outriggers. The second pair of outriggers can be connected to and arranged transverse the pair of side rails and have a distal end positioned to extend outwardly from the axis of the trailer such that each distal end of the second pair of outriggers extends wider than the pair of side rails.

In an embodiment, each distal end portion of the first pair of outriggers can include a first proppant container coupling element positioned adjacent each distal end portion thereof to engage and secure a first proppant container of the plurality of proppant containers to the trailer assembly. In an embodiment, each distal end portion of the second pair of outriggers can include a second proppant container coupling element positioned at each distal end portion thereof to engage and secure a second proppant container coupling element positioned at each distal end portion thereof to engage and secure a second proppant container of the plurality of proppant containers to the trailer assembly.

In an embodiment, the first pair of outriggers can include a first outrigger positioned at the front end of the frame and a second outrigger positioned at a rear end of the frame, and the second pair of outriggers can include a dual outrigger positioned at a middle portion of the frame between the first outrigger and the second outrigger. In an embodiment, the dual outrigger can have one or more pairs of proppant container coupling elements positioned at each distal end thereof to engage and secure one or more proppant containers of the plurality of proppant containers to the trailer assembly.

In an embodiment, the one or more pairs of proppant container coupling elements can further include a mounting platform and one or more locking mechanism to secure the one or more proppant containers to a top surface of the dual outrigger.

In an embodiment, each of the one or more locking mechanisms can include a lever positioned to rotate a body portion of the locking mechanism to engage the proppant container of the plurality of proppant containers so as to secure the proppant container to the top surface of the dual outrigger.

In an embodiment, the second section elevation can be substantially equal to a third section elevation, relative to the ground plane, so as to enable distribution and stability of the load along the second section and the third section.

In an embodiment, the first section can include a plurality of support beams positioned transverse the pair of side rails and arranged so as to provide structural support to the three or more wheel and axle assemblies and to distribute the load among the three or more wheel and axle assemblies.

In an embodiment, the pair of side rails can extend along the at least a portion of the length of the frame at a first side rail elevation, and the pair of side rails can extend along at least a portion of a length of the connector section at a second side rail elevation, the second side rail elevation being greater than the first side rail elevation with respect to the ground plane.

In an embodiment, the pair of side rails can extend along the at least a portion of the length of the connector section. The pair of side rails can include a first portion having the second elevation and a second portion extending from the second elevation to a third elevation in the direction of travel, and the second elevation can be greater than the third elevation.

In an embodiment, the trailer assembly can further include a jack connected to the connector section, the jack having a retractable leg that is movable between an in position and an out position, to provide support and stability to the trailer assembly when the trailer assembly is stationary and when the jack is in the out position.

In an embodiment, a cross-sectional shape of each of the first pair of outriggers and the second pairs of outriggers can include a first width of a bottom surface of the outrigger and a second width of a top surface of the outrigger. In an embodiment, the first width can be greater than or equal to the second width so as to distribute and stabilize the load over a larger surface area.

In another embodiment a trailer assembly for transporting a plurality of proppant containers along a roadway includes a frame having a skeletal structure with a first section, a second section, a third section, and a fourth section, the first section positioned at a rearward end of the frame, relative to a direction of travel of the trailer assembly, the fourth section positioned at a forward end of the frame, relative to the direction of travel, and the second section and the third section being positioned between the first section and the fourth section. The frame is positioned to support the plurality of proppant containers in a side-by-side arrangement and includes a first pair of spaced-apart side rails forming the first section. The first pair of side rails are substantially parallel to one another. The frame also includes a plurality of transversely-extending members extending between the first pair of spaced-apart side rails and open areas positioned between adjacent transversely-extending members of the plurality of transversely-extending members. In certain embodiments, the frame includes a second pair of spaced-apart side rails forming the second section and the third section, the second pair of side rails being substantially parallel to one another and arranged to receive and support the plurality of proppant containers when substantially filled with proppant and positioned thereon, so as to stabilize and distribute a load applied to the frame. Moreover, the frame includes a third pair of spaced-apart side rails forming the fourth section, the third pair of side rails being substantially parallel to one another, the plurality of transversely-extending members extending between the third pair of spaced-apart side rails, and open areas arranged between adjacent transversely-extending members of the plurality of transversely-extending members. Additionally, the frame includes three or more wheel and axle assemblies positioned proximate the first section, each wheel and axle assembly including a plurality of wheels rotatably connected to each axle to facilitate movement of the trailer assembly. The wheel and axle assemblies are positioned to redistribute at least a portion of the load transferred to the trailer assembly by the plurality of proppant containers from the second section and the third section when positioned thereon. In certain embodiments, the trailer assembly includes a first pair of outriggers positioned to extend transverse the second pair of spaced-apart side rails and extending outwardly from the second pair of side rails. Moreover, the trailer assembly includes a second pair of outriggers arranged proximate an outrigger of the first pair of outriggers and transverse the second pair of spaced-apart side rails and extending outwardly from the second pair of side rails.

In an embodiment, the trailer assembly can further include a plurality of transversely-extending members arranged between the second pair of spaced-apart side rails, the transversely-extending members being positioned proximate the first pair of outriggers and the second pair of outriggers to enhance the structural integrity and stability of the frame.

In an embodiment, the plurality of proppant containers can be arranged in the side-by-side arrangement substantially co-axial along a trailer axis extending along a length of the trailer assembly, each proppant container of the plurality of proppant containers being connected to a respective pair of outriggers such that the proppant containers are secured to the trailer assembly.

In an embodiment, each distal end portion of the first pair of outriggers further includes a first proppant container coupling element positioned adjacent each distal end portion thereof to engage and secure a first proppant container of the plurality of proppant containers to the trailer assembly, and each distal end portion of the second pair of outriggers includes a second proppant container coupling element positioned at each distal end portion thereof to secure a second proppant container of the plurality of proppant containers to the trailer assembly.

In an embodiment, the first pair of outriggers can include a first outrigger positioned at the front end of the frame and a second outrigger positioned at a rear end of the frame, and the second pair of outriggers can include a dual outrigger positioned at a middle portion of the frame between the first outrigger and the second outrigger. In an embodiment, the dual outrigger can have one or more pairs of proppant container coupling elements positioned at each distal end thereof to engage and secure one or more proppant containers of the plurality of proppant containers to the trailer assembly.

In an embodiment, the one or more pairs of proppant container coupling elements can further include a mounting platform and one or more locking mechanism to secure the one or more proppant containers to a top surface of the dual outrigger.

In an embodiment, the plurality of proppant containers can be arranged in the side-by-side arrangement on one or more of the second section and the third section of the frame. In an embodiment, a first section elevation and a fourth section elevation are each greater than a second section elevation and a third section elevation, so as to enable distribution and stability of the load at the lower-elevated second section and lower-elevated third section.

In another embodiment, a method for transporting a plurality of proppant containers along a roadway is described. In an embodiment, the method can include positioning the plurality of proppant containers in a side-by-side arrangement on a skeletal frame structure, the frame structure having open areas positioned between structural components to enhance a weight reduction of the frame. In an embodiment, the method can further include supporting the plurality of proppant containers with a pair of spaced-apart side rails on the frame structure, the pair of side rails being substantially parallel to one another, the pair of side rails being structurally strengthened to support and stabilize the plurality of proppant containers when substantially filled with proppant and positioned thereon, and arranged to extend along at least a portion of a length of the frame structure so as to distribute a load of the plurality of containers applied to the frame. In an embodiment, the method can further include securing the plurality of containers to the frame structure via a first pair of outriggers and a second pair of outriggers. In an embodiment, the first pair of outriggers can be connected to and arranged transverse the pair of side rails, each of the first pair of outriggers having a distal end portion being positioned to extend outwardly from an axis of the trailer such that each distal end of the first pair of outriggers extends wider than the pair of side rails. In an embodiment, the second pair of outriggers can be arranged proximate the first pair of outriggers, the second pair of outriggers connected to and arranged transverse the pair of side rails, each of the second pair of outriggers having a distal end being positioned to extend outwardly from the axis of the trailer such that each distal end of the second pair of outriggers extends wider than the pair of side rails. In an embodiment, the method can further include transporting the plurality of proppant containers on the frame structure via three or more wheel and axle assemblies positioned proximate a rear end of the frame, relative to a direction of travel of the trailer assembly, each wheel and axle assembly including a plurality of wheels rotatably connected to each axle to enable distribution and stability of the load along the length of the frame.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 2 is a top plan view of the trailer assembly of FIG. 1, according to an embodiment of the present disclosure;

FIG. 3 is a side elevational view of the trailer assembly of FIG. 1, according to an embodiment of the present disclosure;

DETAILED DESCRIPTION

Figure 1:
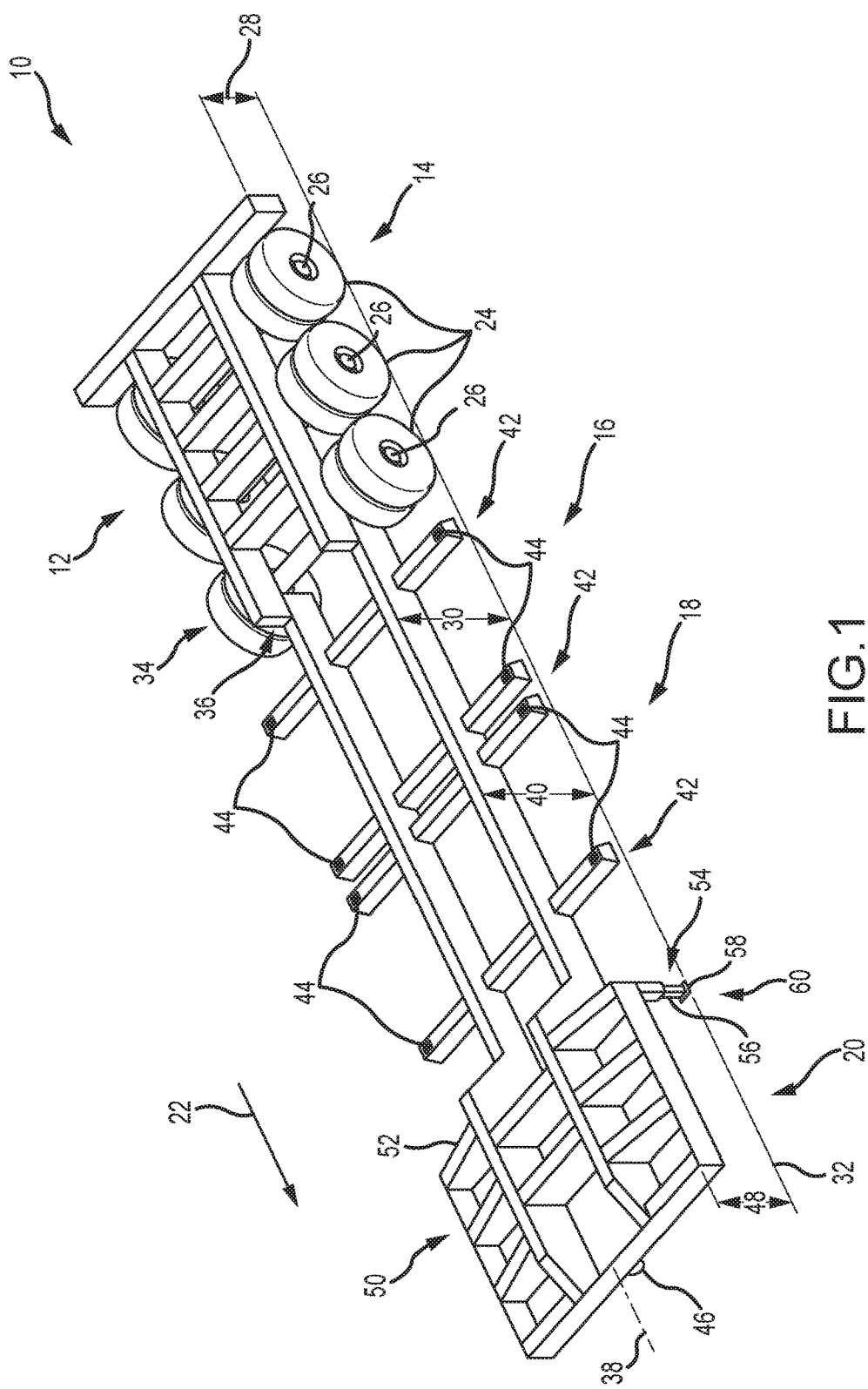
FIG. 1 is a front perspective view of an embodiment of a trailer assembly, according to an embodiment of the present disclosure.

The foregoing aspects, features, and advantages of the present disclosure will be further appreciated when considered with reference to the following description of embodiments and accompanying drawings. In describing the embodiments of the invention illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present disclosure are not intended to be interpreted as excluding the existence of additional embodiments that also incorporate the recited features. Furthermore, reference to terms such as "above," "below," "upper," "lower," "side," "front," "back," or other terms regarding orientation are made with reference to the illustrated embodiments and are not intended to be limiting or exclude other orientations.

Embodiments of the present disclosure include a trailer assembly for transporting a plurality of proppant containers to and from well sites, and associated methods. In certain embodiments, the trailer assembly includes a skeletal frame structure having a middle section positioned to receive the plurality of proppant containers, that is positioned at a lower elevation, relative to a ground plane, than a rear section and a connector section, so as to enable distribution and stability of a load of the plurality of proppant containers when substantially filled with proppant and positioned on the lower-elevated middle section. The skeletal frame structure is formed from a pair of spaced-apart, substantially parallel side rails structurally strengthened to support and stabilize the plurality of proppant containers when substantially filled with proppant and positioned on the skeletal frame structure, and arranged to extend along at least a length of the frame so as to distribute the load applied to the frame substantially along the length of the frame. Open areas positioned between structural components of the frame can enhance weight reduction of the frame, to allow for heavier proppant loads to be carried, subject to highway weight regulations. In certain embodiments, pairs of outriggers are arranged along the middle section and positioned to extend through the side rails, arranged transverse the pair of side rails. The outriggers are arranged to extend outwardly from a trailer assembly axis to distribute a load from the plurality of proppant containers along a wider area, thereby increasing the structural integrity and support capabilities of the trailer assembly. In certain embodiments, the pairs of outriggers extend through holes formed in the side rails. Moreover, in certain embodiments, the pairs of outriggers extend through slots formed in the side rails. Accordingly, a plurality of proppant containers can be positioned in a side-by-side arrangement on the trailer assembly and coupled to the outriggers to facilitate movement along roadways. Three or more wheel and axle assemblies positioned proximate a rear portion of the frame, relative to the direction of travel of the trailer assembly, can each include a plurality of wheels rotatably connected to each axle to facilitate movement of the trailer assembly. By positioning the wheel and axle assemblies rearward of the proppant container load, relative to the direction of travel, distribution and stability of the load along the length of the frame can be achieved.

In some embodiments, the described trailer assembly is utilized in a method for transporting a plurality of proppant containers along a roadway. For example, the method can include positioning the plurality of containers in a side-by-side arrangement on a skeletal frame structure as described above. The skeletal frame structure can include open areas positioned between structural components to enhance weight reduction of the frame, in order to maximize proppant storage and transport weights, while still complying with highway weight regulations. The method can also include supporting the plurality of proppant containers with a pair of spaced-apart side rails on the frame structure. As described above, the pair of side rails can be substantially parallel to one another, and can be structurally strengthened to support and stabilize the plurality of proppant containers, particularly when the proppant containers are substantially filled and positioned on the parallel side rails of the frame. The side rails can be arranged to extend along at least a portion of a length of the frame structure so as to distribute the load applied by the plurality of proppant containers to the frame.

In some examples, the method can further include securing the plurality of containers to the frame structure with a series of outriggers. For example, a first pair of outriggers can be connected to and arranged transverse the pair of side rails. As described above, each of the first pair of outriggers can have a distal end portion positioned to extend outwardly from an axis of the trailer such that each distal end of the first pair of outriggers extends wider than the pair of side rails. This arrangement can provide for stability and support for the proppant containers on the frame. A second pair of outriggers can be arranged proximate the first pair of outriggers, and can similarly be connected to and arranged transverse the pair of side rails. As with the first pair of outriggers, the second pair of outriggers can have a distal end portion positioned to extend outwardly from an axis of the trailer such that each distal end of the first pair of outriggers extends wider than the pair of side rails.

In an embodiment, the method can further include transporting the plurality of proppant containers on the frame structure via three or more wheel and axle assemblies positioned proximate a rear end of the frame, relative to a direction of travel of the trailer assembly. Each wheel and axle assembly can include a plurality of wheels rotatably connected to each axle to enable distribution and stability of the load along the length of the frame.

FIG. 1 is a front perspective view of an embodiment of a trailer assembly 10. As shown, the trailer assembly 10 includes a frame 12 forming a skeletal, light-weight structure to support one or more containers. For example, the skeletal structure of the frame 12 reduces the material utilized to form the frame 12, while still providing sufficient structural rigidity and strength to accommodate one or more containers which may be filled with fracking proppant. For example, as will be described below, in certain embodiments the skeletal frame may include one or more transversely-extending members extending between substantially parallel side rails to provide structural support to the frame 12 while reducing weight by forming open areas in the frame 12.

In the illustrated embodiment, the skeletal frame 12 includes a first section 14, a second section 16, a third section 18, and a fourth section 20 (e.g., a connector section). As shown, the first section 14 is arranged near a rearward portion of the trailer assembly 10, relative to a direction of travel 22 of the trailer assembly 10. In certain embodiments, the first section 14 includes one or more pairs of wheels 24 rotatably coupled to axles 26 to facilitate movement of the trailer assembly 10 along roadways. In the embodiment illustrated in FIG. 1, the trailer assembly 10 includes three axles 26 that support the wheels 24. Moreover, in the illustrated embodiment, each axle 26 includes four wheels 24 (e.g., two wheels 24 on each end of each axel 26). While the illustrated embodiment includes three axles 26, in certain embodiments the trailer assembly 10 may include 1, 2, 4, 5, 6, 7, 8, 9, 10 or any other suitable number of axles 26. Furthermore, while the illustrated embodiment includes two wheels 24 on each end of each axle 26, in other embodiments there may be 1, 3, 4, 5, or any suitable number of wheels 24. Highway regulations often limit an amount of weight transported per axle; accordingly, embodiments providing greater numbers of axles—and associated wheels—can allow for transportation of greater amounts of proppant on a single trailer assembly. For example, a trailer assembly 10 having three axles 26, as illustrated in FIG. 1, can be permitted to carry more weight in proppant containers than a similar trailer assembly having only two axles, and therefore can be more efficient and cost effective in transporting proppant.

In order to support the additionally permitted proppant weight, axles 26 can be reinforced by support beams of frame 12. For example, a plurality of support beams can be arranged transverse the pair of side rails 82, 84, which can be arranged parallel to one another to form the first section 14 of frame 12. This plurality of support beams can extend between the pair of side rails 82, 84 and can provide physical reinforcement to each of axles 26 to allow for distribution and stabilization of the weight of the proppant container load along the length of frame 12.

Moreover, in the illustrated embodiment, the axles 26 and wheels 24 are illustrated as being positioned proximate the first section 14. However, in certain embodiments, the axles 26 and wheels 24 may be positioned proximate the second section 16, the third section 18, and/or the fourth section 20 to facilitate distribution of the weight of the proppant containers. Moreover, the arrangement of the wheels 24 may be distributed along each of the first, second, third, and fourth sections 14, 16, 18, 20 and/or at particularly selected positions. For example, wheels 24 may be positioned proximate the first and second sections 14, 16, the first and third sections 14, 18 and/or any other combination of sections 14, 16, 18, 20 in order to facilitate transportation of proppant containers via the frame assembly 10.

As shown in FIG. 1, the first section 14 is coupled to the second section 16. Moreover, in the illustrated embodiment, the first section 14 is arranged at a first section elevation 28 that is higher than a second section elevation 30, relative to a ground plane 32. In other words, the first section 14 is farther away from the ground plane 32 than the second section 16. As will be described in detail below, lowering the second section 16 enables containers with higher elevations to be transported on the trailer assembly 10 and still comply with governmental regulations for shipping heights to enable passage of the trailer assembly 10 along common roadways while still maintaining sufficient clearance for driving beneath bridges, toll plazas, elevated roadways, and the like. Furthermore, arranging the proppant containers lower to the ground plane 32 lowers the center of gravity of the trailer assembly 10, thereby improving stability and turning capabilities.

In the illustrated embodiment, the first section 14 partially overlaps the second section 16. That is, a front portion 34 of the first section 14 overlaps a rear portion 36 of the second section 16. In some embodiments, the overlapping portions of the first section 14 and the second section 16 can include the side rails 82, 84 of first section 14 overlapping the side rails 86, 88 of second section 16. In some embodiments, the side rails 82, 84 of first section 14 can overlap the side rails 86, 88 of second section 16 by several inches or several feet in order to increase stability and balance of trailer assembly 10. In other embodiments, the side rails 82, 84 of first section 14 can overlap the side rails 86, 88 of second section 16 by only a few inches or a few feet in order to decrease weight of trailer assembly 10. In some embodiments, the front portion 34 of the first section 14 overlapping the rear portion 36 of the second section 16 can be coupled by a fastener, such as a bolt, a nail, a screw, a rivet, or any other suitable fastener to secure the first section 14 to the second section 16.

As described above, the front portion 34 and rear portion 36 are described with reference to the direction of travel 22. In the illustrated embodiment, the second section 16 and the third section 18 are arranged side-by-side and coaxial such that the second section 16 substantially abuts the third section 18. That is, the second section 16 and the third section 18 are arranged along a trailer axis 38 and form at least a portion of the frame 12. Moreover, the second section elevation 30 is substantially equal to a third section elevation 40. As will be described in detail below, the second and third sections 16, 18 are arranged to receive one or more proppant containers on outriggers 42. In the illustrated embodiment, the outriggers 42 include proppant container coupling elements 44 to receive, align, and secure the proppant containers to the trailer assembly 10.

Returning to the frame 12, as illustrated in FIG. 1 the third section 18 is coupled to the fourth section 20 at an end opposite the connection to the second section 16. In the illustrated embodiment, the fourth section 20 is a gooseneck connector to enable coupling to a work vehicle, such as a truck. For example, in the illustrated embodiment the fourth section 20 includes a vehicle coupling element 46 to facilitate connection between the trailer assembly 10 and the truck.

In certain embodiments, the fourth section 20 is positioned on the third section 18. That is, the fourth section 20 at least partially overlaps the third section 18. As a result, a fourth section elevation 48 may be higher, relative to the ground plane 32, than the second and third section elevations 30, 40. Furthermore, in the illustrated embodiment, the fourth section 20 includes an outer frame 50 that substantially aligns with the outriggers 42. The outer frame 50 extends outwardly from the trailer axis 38 and includes a plurality of supports 52. In the illustrated embodiment, the plurality of supports 52 are positioned transverse the trailer axis 38 and the side rails 90, 92. In other embodiments, the plurality of supports 52 can be positioned parallel to the trailer axis 38 and the side rails 90, 92. As shown, the plurality of supports 52 extend perpendicularly away from the side rails 90, 92 to an outer perimeter of the outer frame 50. In some embodiments, a width of outer frame 50 can be equal to a width of one or more outriggers 42, such that the skeletal frame of trailer assembly 10 has a consistent width, which in some examples can be determined based on highway regulations. In other embodiments, the width of outer frame 50 can be greater than or less than the width of one or more outriggers 42, for example to increase stability or to reduce weight, respectively.

As illustrated in FIG. 1, side rails 90, 92 of fourth section 20 extend at an angle parallel to the ground plane 32 for a portion of the length of fourth section 20, and then extend at a downward angle toward the ground plane 32 towards vehicle coupling element 46. This configuration may better allow for coupling of the trailer assembly 10 to a work vehicle via vehicle coupling element 46. In other embodiments, side rails 90, 92 may maintain a substantially constant elevation with respect to and parallel to the ground plane 32.

As shown, the outer frame 50 and the plurality of supports 52 further form a substantially skeletal structure, having open areas 106 between the plurality of supports 52 and side rails 90, 92, to minimize weight of the frame. Furthermore, in certain embodiments, the frame 50 and supports 52 may not be coupled to the fourth section 20.

As shown in FIG. 1, in certain embodiments the fourth section 20 includes a jack or footer 54. The jack 54 includes a retractable leg 56 that includes a base plate 58 for contacting the ground plane 32. For example, the retractable leg 56 may be positioned in an out position 60, as shown in FIG. 1, when the trailer assembly 10 is not coupled to a work vehicle. However, the retractable leg 56 may be positioned in an in position 62 (as illustrated in FIG. 3) when the trailer assembly 10 is coupled to a work vehicle. Accordingly, the jack 54 may be utilized to stage and/or position the trailer assembly 10 in preparation for being connected to the work vehicle.

FIG. 2 is a top plan view of an embodiment of the trailer assembly 10. As illustrated, the fourth section 20 is coupled to the third section 18, which is also coupled to the second section 16, which is further coupled to the first section 14. Moreover, each section 14, 16, 18, 20 is substantially coaxial along the trailer axis 38. In other words, the sections 14, 16, 18, 20 are axially aligned along a length 80 of the trailer assembly 10 to thereby form the trailer assembly 10.

In the illustrated embodiment, the frame 12 includes a first pair of spaced-apart and substantially parallel side rails 82, 84. Moreover, the frame 12 includes a second pair of spaced-apart and substantially parallel side rails 86, 88. Additionally, the frame 12 includes a third pair of spaced-apart and substantially parallel side rails 90, 92. While the illustrated embodiment includes three pairs of side rails, it is understood that, in certain embodiments, there may be one pair of side rails, two pairs of side rails, four pairs of side rails, or any suitable number of pairs of side rails to form the frame 12. Furthermore, while the illustrated embodiment includes substantially parallel side rails, in other embodiments, the side rails may not be substantially parallel. For example, the side rails may be arranged at acute or obtuse angles relative to one another.

As shown in FIG. 2, the second section 16 includes a pair of outriggers 42. As used herein, outrigger 42 refers to a member having two opposite ends that extend transverse the trailer axis 38. That is, in certain embodiments, the outriggers 42 extend transverse the side rails 86, 88 and further extend outwardly from the side rails 86, 88. In order words, the outriggers 42 extend across the trailer axis 38 and the side rails 86, 88 to a position where the ends of the outriggers 42 extend beyond the side rails 86, 88. For example, a first outrigger 94 and a second outrigger 96 are arranged in a spaced-apart and substantially parallel relationship to one another. In certain embodiments, the outriggers 94, 96 are spaced approximately 2.7 meters apart (approximately 9 feet apart) to accommodate the proppant container. However, it is understood that the spaced-apart relationship of the outriggers 94, 96 can be any distance to facilitate the transportation of the one or more proppant containers. For example, the outriggers 94, 96 may be approximately 2.4 meters apart (approximately 8 feet), approximately 3 meters apart (approximately 10 feet), approximately 3.3 meters apart (approximately 11 feet), or any suitable distance apart from one another. As shown, the outriggers 94, 96 extend outwardly from the trailer axis 38 to a position that is substantially aligned with the width at which wheels 24 extend beyond the side rails 86, 88. However, it is appreciated that, in certain embodiments, the outriggers 94, 96 may not be aligned with the wheels 24. Moreover, an outrigger length 98 may be defined by the structural dimensions of the proppant container. For example, the outriggers 94, 96 may be sufficiently long to receive and support the proppant container.

Furthermore, as illustrated in FIG. 2, the third section 18 also includes a pair of outriggers 42. For example, a third outrigger 100 and a fourth outrigger 102 are arranged in a spaced-apart and substantially parallel relationship to one another and to the first and second outriggers 94, 96. As shown, the second outrigger 96 and the third outrigger 100 are closely positioned to one another. However, the second outrigger 96 and third outrigger 100 are spaced apart such that one or more proppant containers can be positioned on the trailer assembly 10 in a side-by-side configuration along the trailer axis 38. For example, a first proppant container can be positioned on the second section 16 and a second proppant container can be positioned on the third section 18 without the first and second proppant containers contacting one another. In this manner, two or more proppant containers can be transported by the trailer assembly 10.

Moreover, as illustrated in FIG. 2, in certain embodiments the outrigger length 98 of each of the first outrigger 94, second outrigger 96, third outrigger 100, and fourth outrigger 102 can be substantially equal. In this manner, modular proppant containers having substantially similar dimensions can be easily loaded onto the trailer assembly onto the second section 16 or the third section 18, thereby simplifying loading procedures. In other embodiments, the outrigger length 98 can be different for one or more of the first outrigger 94, second outrigger 96, third outrigger 100, and fourth outrigger 102.

As will be described in detail below, the trailer assembly 10 can haul a plurality of proppant containers (e.g., two, three, four, five, etc.) on the outriggers 42. In the illustrated embodiment, the proppant containers will be positioned in a middle or central portion of the trailer assembly (e.g., along the second section 16 and third section 18). As a result, the load applied to the trailer assembly 10 by the proppant containers will be distributed over the length 80 of the trailer (e.g., between the fourth section 20 and the first section 14). For example, in the illustrated embodiment, the trailer assembly 10 includes three axles 26, which can include a wheel and axle assembly. As a result, the trailer assembly 10 can hold more weight because the weight per axle is decreased when compared to, for example, two axle trailers. Often, government regulations limit the weight per axle a trailer can transport along roadways. By increasing the number of axles, greater loads can be transported along roadways. Moreover, the stability of the trailer assembly 10 is increased because the load is evenly distributed along more axles over a greater surface area. That is, the load is distributed over more wheels 24 along a greater length (e.g., represented by the offset distance of the wheels 24 relative to one another). Furthermore, at least a portion of the load is transferred to the fourth section 20, thereby further distributing the load over the length 80 of the trailer assembly 10. For example, in certain embodiments, the load may be distributed along the length 80 of the trailer assembly 10 such that the fourth section 20 receives approximately $2 \times 10^5$ N (approximately 46,600 pounds) and the first section 14 receives approximately $2.2 \times 10^5$ N (approximately 49,500 pounds) due to the configuration of the trailer assembly 10. Therefore, a majority of the weight is transferred to the first section 14 and fourth section 20 while enabling the load to be arranged on the lower second section 16 and third section 18 to improve stability and decrease overall height. Accordingly, by positioning the outriggers 42 along the middle section of the trailer assembly 10 and increasing the number of axles, the present disclosure enables greater loads of proppant to be transported while also improving stability of the trailer assembly 10.

As described above, the frame 12 has a skeletal structure to reduce the weight of the trailer assembly 10, thereby enabling greater total loads to be hauled because the portion of the load attributed to the trailer assembly 10 is decreased. In certain embodiments, the frame 12 includes transversely-extending cross members 104 extending between the substantially parallel side rails 82, 84, 86, 88, 90, 92. For example, in the illustrated embodiment, the transversely-extending cross members 104 are arranged at the first section 14 to extend between the side rails 82, 84. As a result, additional support is provided to the first section 14 without substantially increasing the weight of the trailer assembly 10 because the transversely-extending cross members 104 may be particularly located to strengthen the trailer assembly 10 at particular locations. For example, the transversely-extending cross members 104 can be positioned at areas proximate the axles 26 because the loads on the trailer assembly 10 may be distributed across the wheels 24.

Moreover, in the illustrated embodiment, the fourth section 20 includes transversely-extending cross members 104 extending between the side rails 90, 92. In certain embodiments, the transversely-extending cross members 104 can extend through the side rails 90, 92 to the outer frame 50, thereby at least partially forming the supports 52. As described above, the transversely-extending cross members 104 can be utilized to strengthen the frame assembly 10 at the fourth section 20 where the frame assembly 10 is coupled to the work vehicle, via the vehicle coupling element 46 (as illustrated in FIG. 1). In this manner, larger loads can be hauled by the trailer assembly 10 due to the increased strength of the trailer assembly 10.

In certain embodiments, the transversely-extending cross members 104 may be positioned on the second section 16 and third section 18 of the trailer assembly 10. That is, the transversely-extending cross members 104 can be arranged to extend between the side rails 86, 88. In certain embodiments, there may not be transversely-extending cross members 104 positioned on the second section 16 and third section 18. However, in certain embodiments, the transversely-extending cross members 104 may be arranged proximate the outriggers 42 to provide additional structural support to the frame 12 at locations where loads are anticipated. For example, by strengthening the areas around the outriggers 42, the frame 12 can support a greater amount of weight, thereby increasing the hauling capacity of the trailer assembly 10. It should be appreciated that the transversely-extending cross members 104 include open areas 106 between adjacent transversely-extending cross members 104, thereby further providing a skeletal structure to the frame 12 and reducing the overall weight of the frame 12, while still providing sufficient support to transport large quantities of proppant.

In the illustrated embodiment, the first section 14 includes a bumper member 108 coupled to the side rails 82, 84. The bumper member 108 is positioned rearward of the front portion 34 of the first section 14, relative to the direction of travel 22. In other words, the bumper member 108 is at the farthest rearward portion of the trailer assembly 10. As will be described below, the bumper member 108 is positioned to receive and support various indicators and features of the trailer assembly 10 to enhance travel along roadways. For example, the bumper member 108 may include mud flaps, signal lights, holders for license plates, and the like.

FIG. 3 is a side elevational view of an embodiment of the trailer assembly 10. In the illustrated embodiment, and as will be described in detail below, the outriggers 42 are arranged such that the proppant container coupling elements 44 position the proppant container substantially flush with a top surface 120 of the second section 16 and a top surface 122 of the third section 18. As a result, in certain embodiments, the proppant container positioned on the trailer assembly 10 can contact the outriggers 42 and the respective top surfaces 120, 122. However, in other embodiments, the proppant containers positioned on the trailer assembly 10 can only contact the outriggers 42, only contact the top surfaces 120, 122, or some other combination thereof. In other words, an elevation of a mounting surface of the proppant container coupling element 44 and/or top surface of the outriggers 42 can be substantially flush with the top surfaces 120, 122, can be greater than the top surfaces 120, 122, or can be less than the top surfaces 120, 122. Moreover, the outriggers 42 utilized in the second section 16 and the third section 18 can be different. For example, the outriggers 100, 102 of the third section 18 can have a higher or lower elevation than the outriggers 94, 96 of the second section 16. Additionally, in certain embodiments, the outriggers 100, 102 of the third section 18 and the outriggers 94, 96 of the second section 16 can have a substantially equal elevation, relative to the ground plane 32.

As shown in FIG. 3, the outriggers 42 are positioned such that they extend through the side rails 82, 84. For example, as will be described in detail below, in certain embodiments the outriggers 42 extend through an opening formed in the side rails 82, 84. Moreover, in certain embodiments, the outriggers 42 extend through a notch or cut-out formed in the side rails 82, 84. However, in certain embodiments, the outriggers 42 are positioned to abut and/or bear against the side rails 82, 84.

In the illustrated embodiment, the outriggers 42 have a polygonal shape, such as generally triangular or quadrilateral. As a result, a lower outrigger portion 124 is wider than an upper outrigger portion 126. That is, a lower outrigger width 128 is greater than an upper outrigger width 130, in the illustrated embodiment. In this manner, the weight of the proppant containers can be evenly distributed along an outrigger thickness 132 and transferred to the frame 12, thereby enabling the trailer assembly 10 to carry large loads, for example, more than $2.2 \times 10^5$ N (approximately 50,000 pounds), more than $2.7 \times 10^5$ N (approximately 60,000 pounds), more $3.1 \times 10^5$ N (approximately 70,000 pounds), more than $3.5 \times 10^5$ N (approximately 80,000 pounds), more than $4 \times 10^5$ N (approximately 90,000 pounds), more than $4.4 \times 10^5$ N (approximately 100,000 pounds), more than $4.9 \times 10^5$ N (approximately 110,000 pounds), more than $6.6 \times 10^5$ N (approximately 150,000 pounds), or any other suitable weight to enable the transportation of fracking proppant to a well site. Furthermore, while the embodiment illustrated in FIG. 3 includes outriggers 42 that are generally polygonal having a different upper width 130 than lower width 128, in certain embodiments, the outriggers 42 can have a substantially equal upper width 130 and lower width 128. For example, the outriggers 42 may be generally square or rectangular. Moreover, in certain embodiments, the outriggers 42 may be circular, arcuate, elliptical, oval or egg-shaped, or any other suitable shape to enable distribution of weight positioned on the outriggers 42. Furthermore, each outrigger 42 utilized by the trailer assembly 10 need not be the same shape. For example, the outriggers 100, 102 associated with the third section 18 can be triangular or polygonal while the outriggers 94, 96 associated with the second section 16 can be elliptical or circular. In this manner, the trailer assembly 10 can be customized to enable efficient transportation of large quantities of proppant.

In the illustrated embodiment, the wheels 24 are positioned along the first section 14 and extend upwardly such that the wheels 24 are higher than the top surfaces of the second and third sections 120, 122. While the illustrated embodiment includes wheels 24 that extend above an elevation of the top surfaces 120, 122, in certain embodiments the wheels 24 may be substantially equal to or below the elevation of the top surfaces 120, 122. As shown, the axles 26 are coupled to the bottom of the first section 14, thereby enabling the wheels 24 to rotate about the axles 26 to facilitate movement of the trailer assembly 10. In certain embodiments, because of the positioning of the wheels outward of the side rails 82, 84, cargo may be positioned onto the first section 14. For example, cargo may be arranged on the side rails 82, 84 and secured to the trailer assembly 10 for transport.

As shown in FIG. 3, the jack 54 is in the in position 62. As a result, the retractable leg 56 is not extending downwardly toward the ground plane 32, thereby enabling movement of the trailer assembly 10 via the wheels 24. As described above, the jack 54 is positioned forward of the first section 14, second section 16, and third section 18, relative to the direction of travel 22. However, it should be appreciated that in certain embodiments the jack 54 may be arranged on any of the first section 14, second section 16, and third section 18. Moreover, multiple jacks 54 may be positioned along the length 80 of the trailer assembly 10, grouped on a single section or spaced across multiple sections, or a combination thereof.

Figure 4:
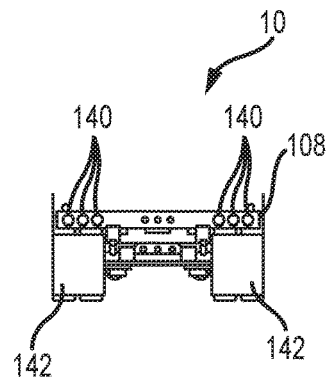
FIG. 4 is a rear elevational view of the trailer assembly of FIG. 1, according to an embodiment of the present disclosure.

FIG. 4 is a rear elevational view of an embodiment of the trailer assembly 10. In the illustrated embodiment, the bumper member 108 includes indicators 140 arranged side-by-side along the bumper member 108. In certain embodiments, the indicators 140 correspond to brake lights, turn signals, reverse lights, and the like. Accordingly, the trailer assembly 10 includes certain features that governmental regulations impose to enable trailers to transport materials along roadways. Moreover, in the illustrated embodiment, the bumper member 108 includes mud flaps 142 extending downwardly and obscuring the view of the wheels 24. The mud flaps 142 prevent mud and debris stuck to the wheels 24 from flying off and impacting other vehicles travelling behind the trailer assembly 10. It should be appreciated that in certain embodiments the mud flaps 142 may not be coupled to the bumper member 108.

As illustrated, the bumper member 108 obscures the view of the outriggers 42, because in certain embodiments the bumper member 108 has a substantially equal width to that of the outriggers 42. As a result, the width of the trailer assembly 10 may be particularly selected to enable transportation of goods, such as fracking proppant, along common roadways without specialized permitting for wide loads.

Figure 5:
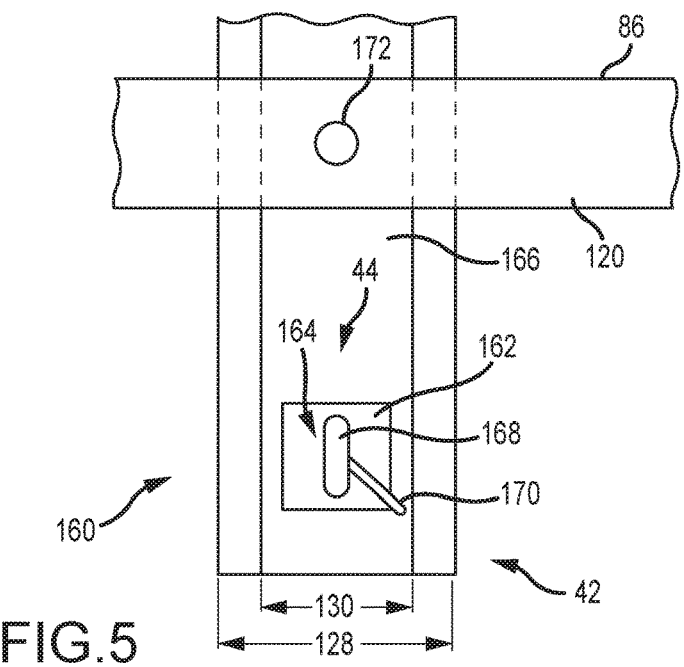
FIG. 5 is a partial top plan view of an embodiment of an outrigger, according to an embodiment of the present disclosure.

FIG. 5 is a top plan view of an embodiment of the outrigger 42 extending through the side rail 86. As described above, in certain embodiments, the outriggers 42 extend through a hole or chamber formed in the side rails 86, 88. In the illustrated embodiment, the outrigger 42 extending through the side rail 86 is represented by the broken lines. Accordingly, it should be understood that the top surface 120 of the second section 16 is positioned over the hole or chamber formed through the side rail 86.

In the illustrated embodiment, the proppant container coupling element 44 is positioned on a distal end 160 of the outrigger 42, relative to the trailer axis 38 and the side rail 86. In other words, the proppant container coupling element 44 is outwardly positioned from the side rail 86. In this manner, by distributing the weight of the proppant container over a wider area, the stability and supporting capabilities of the trailer assembly 10 are increased. As shown, the proppant container coupling element 44 includes a mounting platform 162 and a locking mechanism 164, such as a twist lock, positioned on a top surface 166 of the outrigger 42. In certain embodiments, the mounting platform 162 has a thickness such that the proppant container, when positioned on the mounting platform 162, is elevated above a top surface 166 of the outrigger 42. However, in certain embodiments, the proppant container may contact the top surface 166 of the outrigger 42 when positioned on the mounting platform 162. In the illustrated embodiment, the locking mechanism 164 is a twist lock having a body portion 168 that is rotated via a lever 170. Upon activation of the lever 170, the body portion 168 rotates to engage the proppant container, thereby securing the proppant container to the trailer assembly 10. While the illustrated embodiment includes the twist lock locking mechanism 164, in other embodiments the locking mechanism 164 and/or proppant container coupling element 44 may include tongue and groove fasteners, cable ties, and the like.

In the illustrated embodiment, the outrigger 42 is secured to the side rail 86 via a fastener 172. For example, the fastener 172 may include a bolt, a nail, a screw, a rivet, or any other suitable fastener to secure the outrigger 42 to the side rail 86. Moreover, while the illustrated embodiment includes one fastener 172, in certain embodiments a plurality of fasteners 172 may be utilized to secure the outrigger 42 to the side rail 86. Moreover, the fastener 172 may secure the outrigger 42 to the side rail 86 from the bottom, as opposed to the illustrated embodiment which includes securement through the top surface 120 of the side rail 86.

Figure 6:
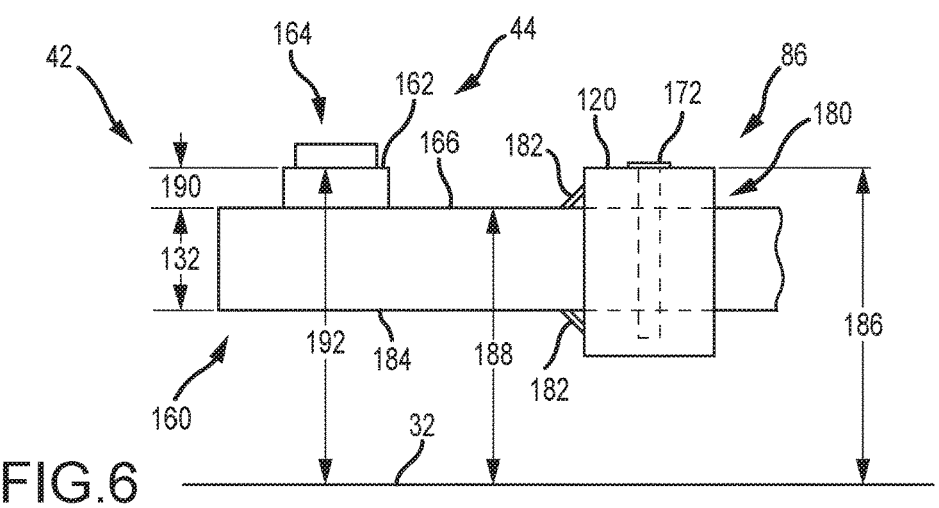
FIG. 6 is a partial side view of the outrigger of FIG. 5, according to an embodiment of the present disclosure.

FIG. 6 is a partial side view of an embodiment of the outrigger 42 extending through the side rail 86. As described above with respect to FIG. 5, in certain embodiments the outrigger 42 extends through a hole 180 formed in the side rail 86. As a result, the top surface 120 of the side rail 86 is arranged above the top surface 166 of the outrigger 42. Moreover, as shown in FIG. 6, in certain embodiments gussets 182 are utilized to provide additional support to the outriggers 42. For example, in the illustrated embodiment, the gussets 182 are angled bars extending between the side rail 86 and the outrigger 42. As shown, the gussets 182 can be arranged on the top surface 166 and/or a bottom surface 184 of the outrigger 42. Moreover, in certain embodiments, the gussets 182 can be utilized on a side of the outrigger 42. Furthermore, in certain embodiments, the gussets 182 may not be used at all. For example, the fastener 172 and hole 180 may be sufficient to secure the outrigger 42 to the side rail 86.

In the illustrated embodiment, the top surface 120 of the side rail 86 is at a higher elevation 186, relative to the ground plane 32, than an elevation 188 of the top surface 166 of the outrigger 42. However, the mounting platform 162 of the proppant container coupling element 44 has a mounting platform thickness 190 that is substantially equal to the difference in elevation between the top surface 166 and the top surface 120. As a result, an elevation 192 of the mounting platform 162 and the elevation 186 of the top surface 120, relative to the ground plane 32, may be substantially equal. However, it should be appreciated that, in certain embodiments, the mounting platform 162 may extend to an elevation higher than the top surface 120 or to an elevation lower than the top surface 120.

Figure 7:
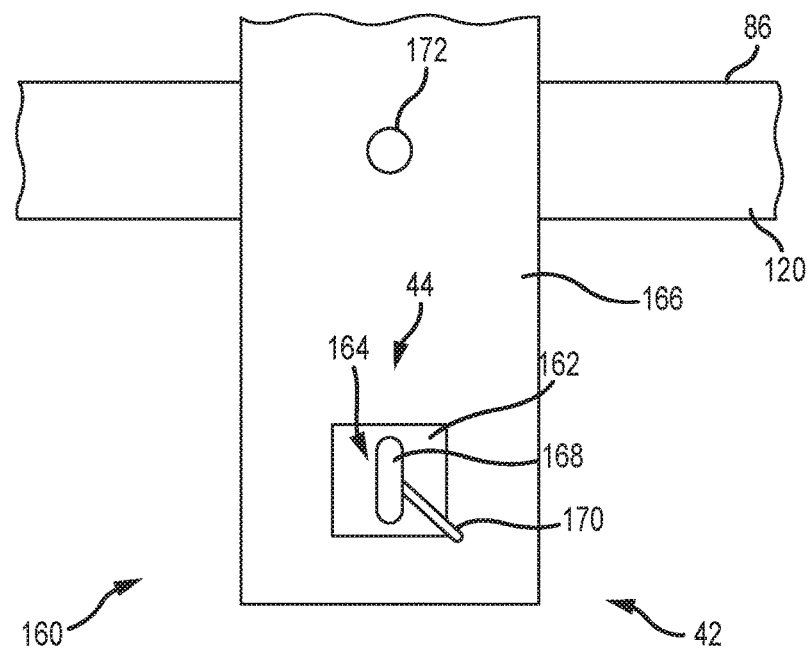
FIG. 7 is a partial top plan view of an embodiment of an outrigger, according to an embodiment of the present disclosure.

FIG. 7 is a top plan view of an embodiment of the outrigger 42 coupled to the side rail 86. As described above, in certain embodiments, the outrigger 42 can be coupled to the side rail 86 via a slot formed in the side rail 86. Thereafter, the fastener 172 can further secure the outrigger 42 to the side rail 86. As a result, in the illustrated embodiment, the top surface 166 is illustrated as extending through the side rail 86.

Figure 8:
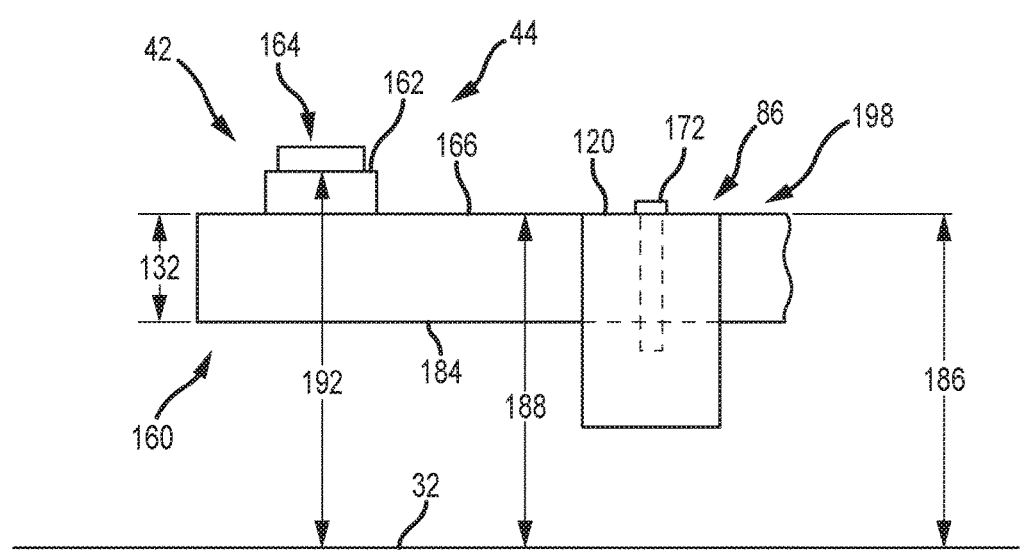
FIG. 8 is a partial side view of the outrigger of FIG. 7, according to an embodiment of the present disclosure.

FIG. 8 is a partial side elevational view of an embodiment of the outrigger 42 coupled to the side rail 86. In the illustrated embodiment, the outrigger 42 is positioned within a slot 198 formed within the side rail 86. As will be appreciated, the slot 198 is sized to accommodate the size and shape of the outrigger 42. For example, a substantially square or rectangular outrigger 42 would be positioned within a corresponding square or rectangular slot 198. Furthermore, in the illustrated embodiment, the fastener 172 secures the outrigger 42 to the side rail 86.

In the illustrated embodiment, the mounting platform 162 is positioned above the top surface 120 of the side rail 86. That is, the mounting platform 162 positions the proppant containers at an elevation higher than the top surface 120, relative to the ground plane 32. However, it should be appreciated that, in certain embodiments, the mounting platform 162 may be substantially flush with the top surface 120.

Figure 9:
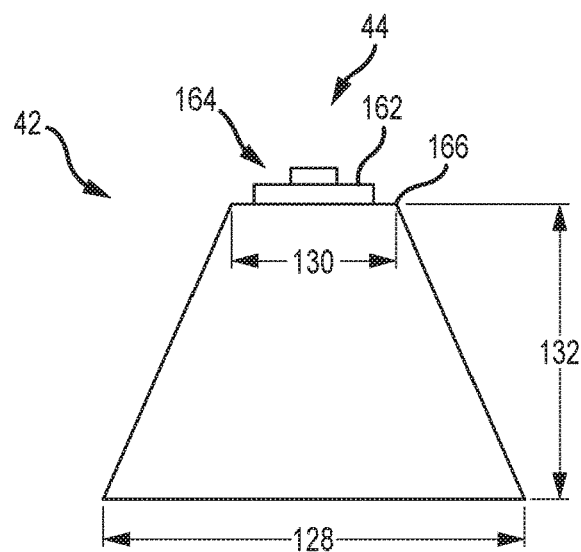
FIG. 9 is a cross-sectional view of an embodiment of an outrigger, according to an embodiment of the present disclosure.
Figure 10:
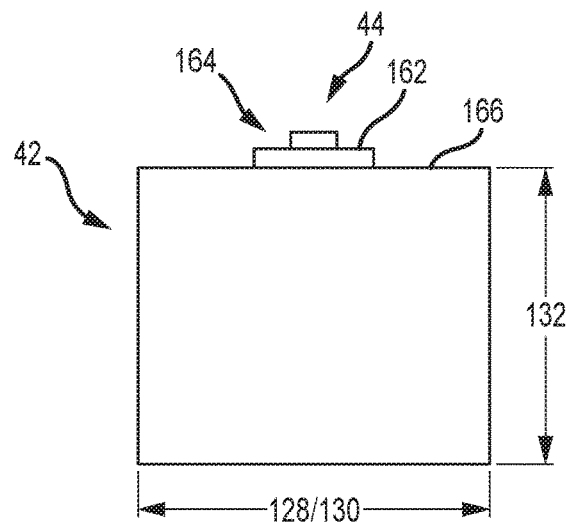
FIG. 10 is a cross-sectional view of an embodiment of an outrigger, according to an embodiment of the present disclosure.
Figure 11:
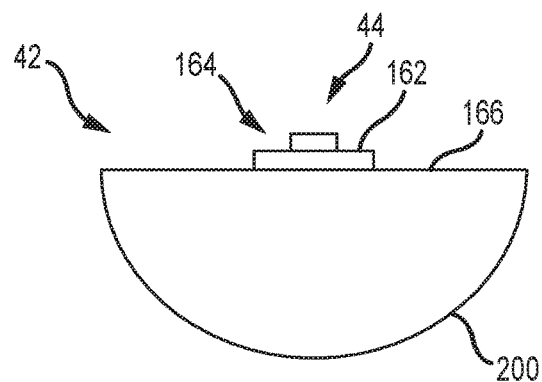
FIG. 11 is a cross-sectional view of an embodiment of an outrigger, according to an embodiment of the present disclosure.

FIGS. 9-11 are cross-sectional views of embodiments of the outriggers 42. Turning to FIG. 9, the outrigger 42 has a shape that is substantially triangular. That is, the lower outrigger width 128 is larger than the upper outrigger width 130. As a result, loads positioned on the outrigger 42 may be distributed over a larger surface area, thereby improving the stability and load carry capabilities of the outrigger 42. In the illustrated embodiment, the outrigger 42 includes the proppant container coupling element 44 positioned on the top surface 166. As a result, in certain embodiments, the proppant container positioned on the outrigger 42 may be placed above the top surface 166 because of the mounting platform 162. However, in other embodiments, the mounting platform 162 may be recessed into the outrigger 42, thereby being substantially flush with the top surface 166.

FIG. 10 is an embodiment of the outrigger 42 having a substantially rectangular cross section. In the embodiment illustrated in FIG. 10, the lower outrigger width 128 is substantially equal to the upper outrigger width 130. Moreover, as illustrated, the proppant container coupling element 44 is arranged on the top surface 166. As described above, in certain embodiments the mounting platform 162 is above the top surface 166. However, in certain embodiments, the mounting platform 162 can be recessed into the outrigger 42.

FIG. 11 is an embodiment of the outrigger 42 having a substantially half-circle, arcuate, or curved cross section. In the embodiment illustrated in FIG. 11, the outrigger 42 includes an arcuate portion 200 and the top surface 166. The arcuate shape of the arcuate portion 200 enables the transfer and distribution of forces acting on the top surface 166 along the curved path, thereby redirecting the force and enabling transportation and support of large volumes of proppant material. While the illustrated embodiment includes a substantially half-circle arcuate portion 200, in other embodiments the arcuate portion 200 may be elliptical, arced, or any other curved shape. Moreover, as illustrated, the proppant container coupling element 44 is arranged on the top surface 166. As described above, in certain embodiments the mounting platform 162 is above the top surface 166. However, in certain embodiments, the mounting platform 162 can be recessed into the outrigger 42.

Figure 12:
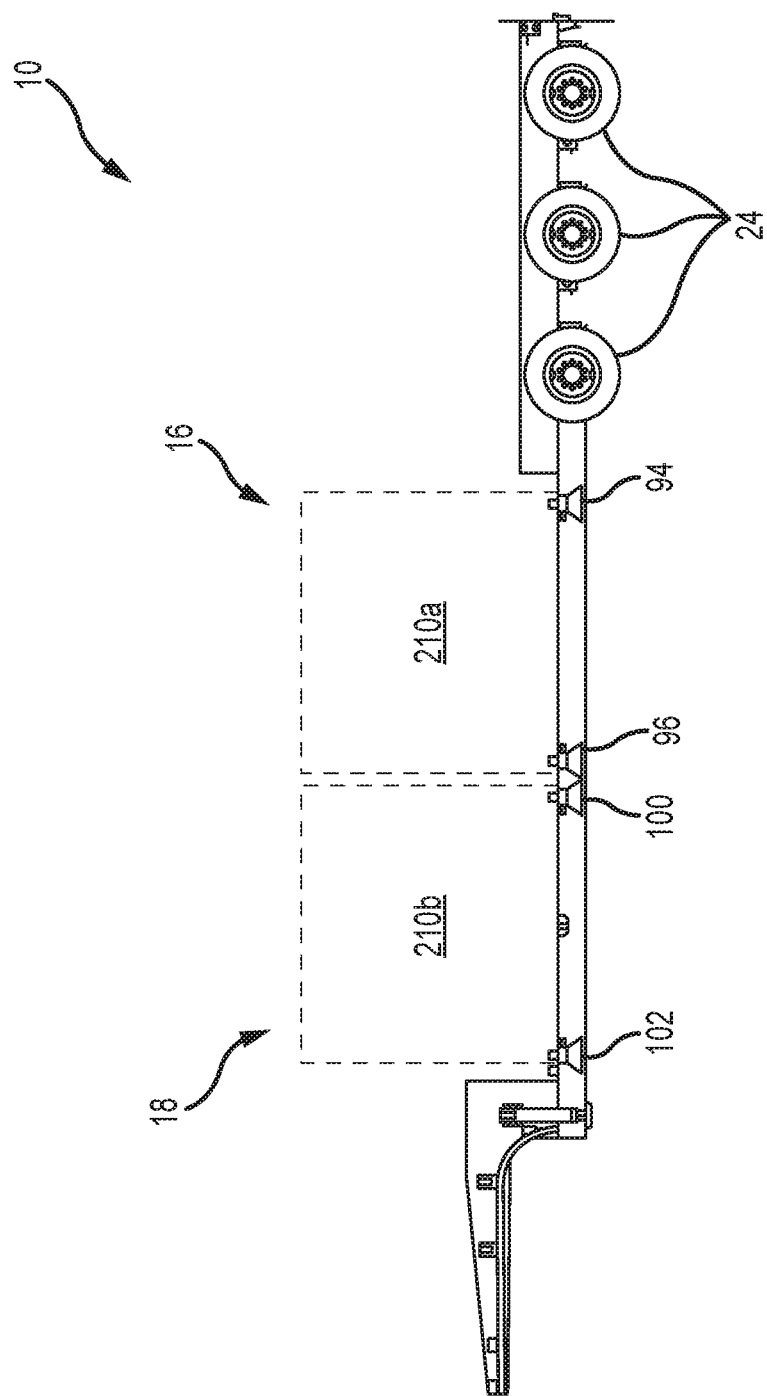
FIG. 12 is a side elevational view of an embodiment of a trailer assembly having proppant containers positioned thereon, according to an embodiment of the present disclosure.

FIG. 12 is a side elevational view of an embodiment of the trailer assembly 10 with proppant containers 210 arranged on the second section 16 and third section 18. As described above, in certain embodiments, the trailer assembly 10 receives, secures, and transports one or more proppant containers 210. The proppant containers 210 can be filled with proppant material and weight approximately 50,000 pounds (approximately $2.2 \times 10^5$ N) each. As illustrated, each of the second section 16 and third section 18 receives the proppant container 210 on the respective outriggers 42. For example, the outriggers 94, 96 positioned on the second section 16 are arranged to receive and support the proppant container 210a and the outriggers 100, 102 positioned on the third section 18 are arranged to receive and support the proppant container 210b. The proppant containers 210a, 210b are arranged in a side-by-side configuration along the length 80 of the trailer assembly 10 substantially co-axially with the trailer axis 38. By arranging the proppant containers 210a, 210b side-by-side along the length 80 of the trailer assembly 10, the width of the trailer assembly 10 is approximately equal to the width of the proppant containers 210a, 210b, thereby enabling transportation along roadways without special permitting for extra wide loads. Accordingly, shipping costs may be decreased.

As shown in FIG. 12, the outriggers 96, 100 are spaced apart such that both proppant containers 210a, 210b can be positioned on the trailer assembly 10 at the same time. Accordingly, shipping costs may be decreased because more proppant can be delivered to a well site at one time, thereby reducing the total number of trips. In certain embodiments, shipping companies charge by the mile and/or trip, and as a result, hauling greater loads per trip reduces the total number of trips, reducing prices for delivering proppant to well sites.

Figure 13:
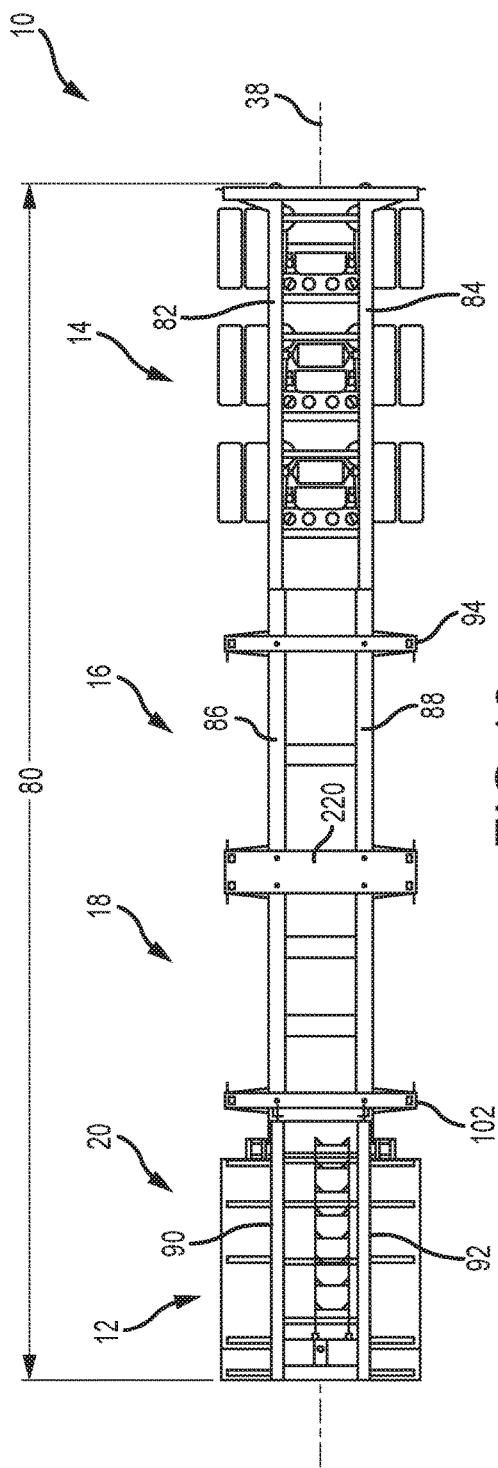
FIG. 13 is a top plan view of an embodiment of a trailer assembly having a dual outrigger, according to an embodiment of the present disclosure.

FIG. 13 is a top plan view of an embodiment of the trailer assembly 10 having a dual outrigger 220 arranged between the second and third sections 16, 18. As used herein, dual outrigger 220 refers to an outrigger having two or more coupling elements 44 arranged on each distal end 160 of the dual outrigger 220. As a result, the dual outrigger 220 may at least partially support the load of two proppant containers 210. The dual outrigger 220 is coupled to the side rails 86, 88 in the same manner as described above. For example, the dual outrigger 220 may extend through the hole 180 formed in the side rails 86, 88. Additionally, in certain embodiments, the dual outrigger 220 may be positioned in the slot 198 formed to receive the dual outrigger 220. As will be described below, the dual outrigger 220 may have a cross-sectional shape similar to the outriggers 42.

Figure 14:
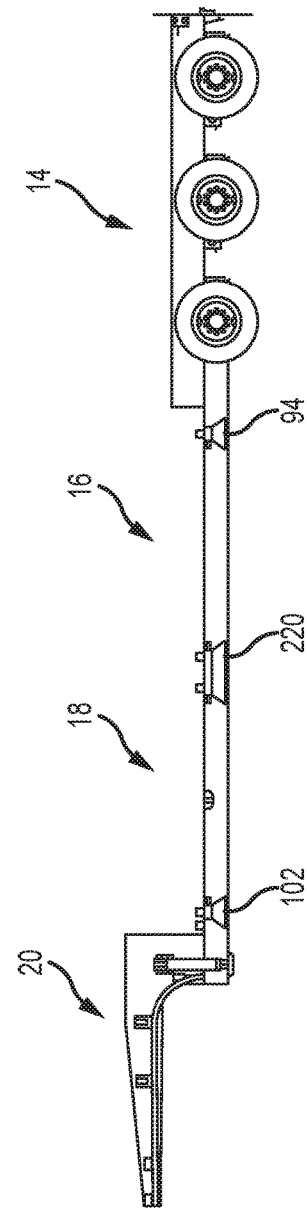
FIG. 14 is a side-elevational view of the trailer assembly of FIG. 13, according to an embodiment of the present disclosure.

FIG. 14 is a side elevational view of an embodiment of the trailer assembly 10 having the dual outrigger 220. As illustrated, the dual outrigger is positioned between the second and third sections 16, 18 and is substantially aligned with the outriggers 94, 102. That is, the top surface 166 of the dual outrigger 220 is substantially aligned with the top surfaces 166 of the outriggers 94, 102. As a result, the proppant containers 210 can be supported on the trailer assembly 10. In the illustrated embodiment, the dual outrigger 220 has a triangular and/or polygonal cross-sectional shape. That is, the upper outrigger width 130 is less than the lower outrigger width 128. Accordingly, the load positioned on the dual outrigger 220 is distributed to the frame 12 over a wider surface area at the bottom of the dual outrigger 220, thereby enabling a larger load to be carried. In other embodiments, the dual outrigger 220 may have a different shape, such as a rectangular or arcuate shape, for example as illustrated in FIGS. 9-11.

Figure 15:
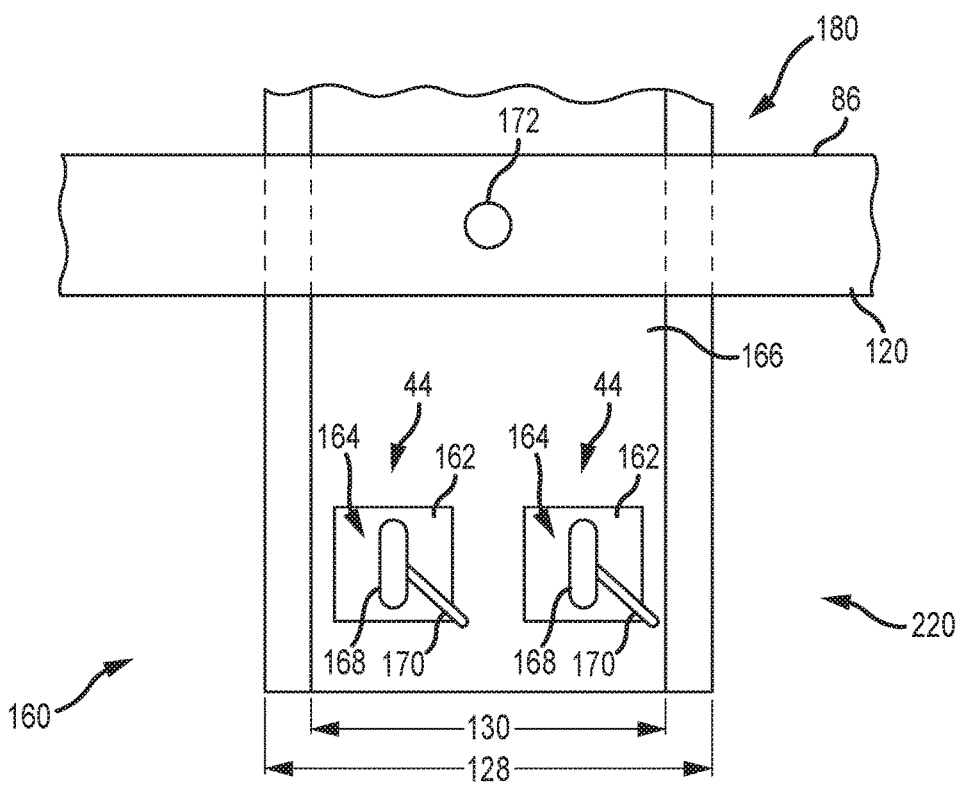
FIG. 15 is a partial top plan view of an embodiment of a dual outrigger, according to an embodiment of the present disclosure.

FIG. 15 is a partial top plan view of the dual outrigger 220 coupled to the side rail 86. In the illustrated embodiment, the dual outrigger 220 extends through the hole 180 formed in the body of the side rail 86. Moreover, the dual outrigger 220 is coupled to the side rail 86 via the fastener 172. As will be appreciated, while the illustrated embodiment includes one fastener 172, in certain embodiments there may be a plurality of fasteners coupling the dual outrigger 220 to the side rail 86. In the illustrated embodiment, dual outrigger 220 includes two coupling elements 44, each of which includes a mounting platform 162 and a locking mechanism 164, such as a twist lock, positioned on a top surface 166 of the dual outrigger 220. In other embodiments, a single proppant container coupling element 44, capable of coupling two proppant containers to dual outrigger 220, may be utilized.

Figure 16:
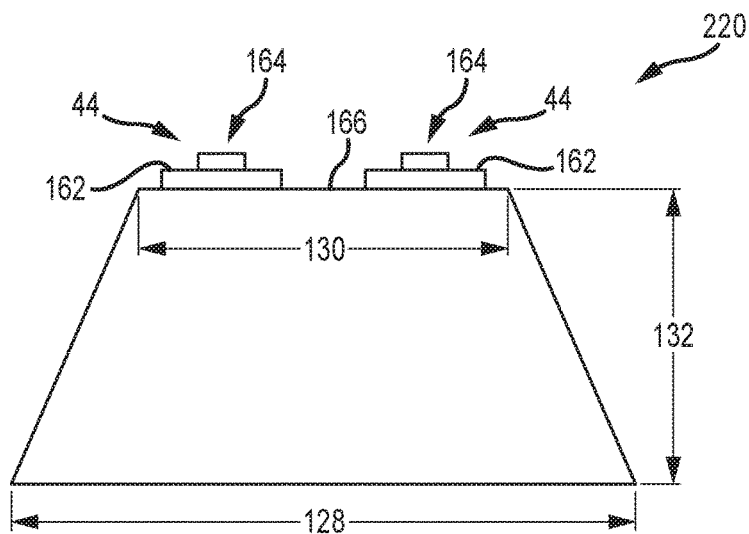
FIG. 16 is a cross-sectional view of an embodiment of a dual outrigger, according to an embodiment of the present disclosure.
Figure 17:
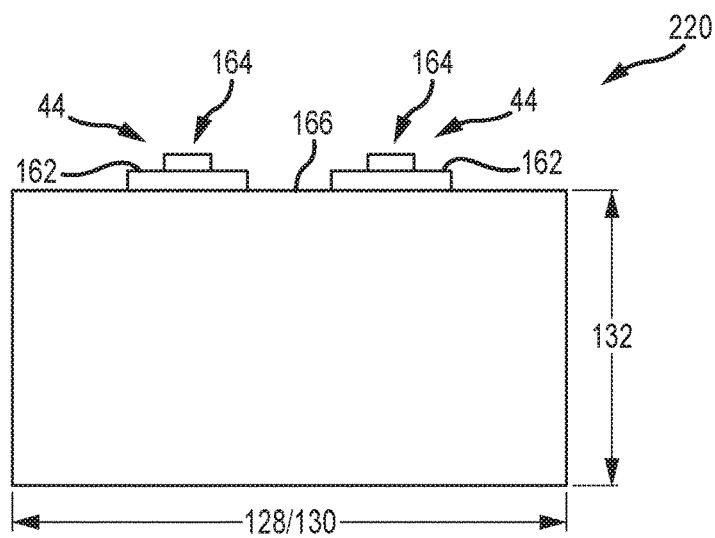
FIG. 17 is a cross-sectional view of an embodiment of a dual outrigger, according to an embodiment of the present disclosure.
Figure 18:
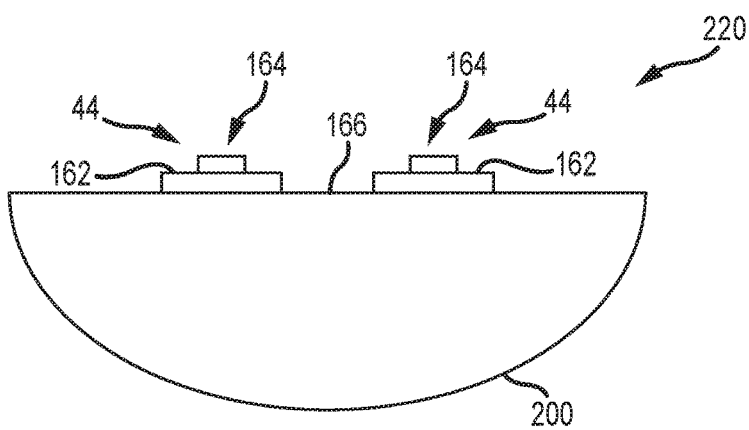
FIG. 18 is a cross-sectional view of an embodiment of a dual outrigger, according to an embodiment of the present disclosure.

FIGS. 16-18 are cross-sectional views of embodiments of the outriggers 42. Turning to FIG. 16, the outrigger 42 has a shape that is substantially triangular. That is, the lower outrigger width 128 is larger than the upper outrigger width 130. As a result, loads positioned on the outrigger 42 may be distributed over a larger surface area, thereby improving the stability and load carrying capabilities of the outrigger 42. In the illustrated embodiment, the outrigger 42 includes the proppant container coupling element 44 positioned on the top surface 166. As a result, in certain embodiments, the proppant container (or, in some embodiments, two proppant containers) positioned on the outrigger 42 may be placed above the top surface 166 because of the mounting platform 162. However, in other embodiments, the mounting platform 162 may be recessed into the outrigger 42, thereby being substantially flush with the top surface 166.

FIG. 17 is an embodiment of the outrigger 42 having a substantially rectangular cross section. In the embodiment illustrated in FIG. 10, the lower outrigger width 128 is substantially equal to the upper outrigger width 130. Moreover, as illustrated, the proppant container coupling element 44 is arranged on the top surface 166. As described above, in certain embodiments the mounting platform 162 is above the top surface 166. However, in certain embodiments, the mounting platform 162 can be recessed into the outrigger 42.

FIG. 18 is an embodiment of the outrigger 42 having a substantially half-circle, arcuate, or curved cross section. In the embodiment illustrated in FIG. 18, the outrigger 42 includes an arcuate portion 200 and the top surface 166. The arcuate shape of the arcuate portion 200 enables the transfer and distribution of forces acting on the top surface 166 along the curved path, thereby redirecting the force and enabling transportation and support of large volumes of proppant material. While the illustrated embodiment includes a substantially half-circle arcuate portion 200, in other embodiments the arcuate portion 200 may be elliptical, arced, or any other curved shape. Moreover, as illustrated, the proppant container coupling element 44 is arranged on the top surface 166. As described above, in certain embodiments the mounting platform 162 is above the top surface 166. However, in certain embodiments, the mounting platform 162 can be recessed into the outrigger 42.

As illustrated in each of FIGS. 16-18, the dual outrigger 220 includes two coupling elements 44, each including a respective mounting platform 162 and respective locking mechanisms 164. When the proppant containers 210 are positioned on the dual outrigger 220 (as illustrated in FIG. 12, for example), an operator may activate the locking mechanisms 14 to secure the proppant containers 210 to the trailer assembly 10. In this manner, the proppant containers 210 can be transported, for example, to a well site.

As described in detail above, embodiments of the present disclosure include the trailer assembly 10 having the skeletal frame 12 for transporting proppant containers along roadways. In certain embodiments, the frame 12 is formed from spaced-apart side rails 82, 84, 86, 88, 90, 92 utilizing minimal materials to improve the structural integrity of the frame 12, while also reducing the weight of the trailer assembly 10. In certain embodiments, the outriggers 42 extend through the side rails 86, 88 to provide a predetermined location to position the proppant containers 210. For example, in certain embodiments, the outriggers 42 extend through the holes 180 and secure the proppant containers 210 to the trailer assembly 10 via the locking mechanisms 164. Moreover, in certain embodiments, the outriggers 42 extend through the slots 198 and secure the proppant containers 210 to the trailer assembly 10 via the locking mechanisms 164. In this manner, the proppant containers 210 can be positioned on and secured to the trailer assembly 10 for transportation along roadways.

This application claims priority to, and the benefit of, U.S. Provisional Application No. 62/345,295, filed Jun. 3, 2016, titled "Trailer Assembly for Transport of Containers of Proppant Material," which is hereby incorporated by reference in its entirety.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A trailer assembly for transporting a plurality of proppant containers along a roadway, the trailer assembly comprising:
   a frame including structural components with open areas positioned therebetween defining a skeletal structure having a first section arranged at a rearward end of the trailer assembly, a second section arranged forward of the first section, a third section arranged forward of the second section and a connector section arranged at a forward end of the trailer assembly, wherein the second and third sections are configured to support the plurality of proppant containers in a side-by-side arrangement along a longitudinal axis of the frame, the structural components including:
   a first pair of spaced-apart side rails extending longitudinally along the first section;
   a second pair of spaced-apart side rails extending longitudinally along the second and third sections and structurally strengthened to support and stabilize the plurality of proppant containers, wherein the first pair of side rails is supported on a top surface of the second pair of side rails such that a first section elevation from a ground plane to a top surface of the first pair of side rails is greater than a second section elevation from the ground plane to the top surface of the second pair of side rails and configured to distribute and stabilize said plurality of proppant containers positioned on the lower-elevated second and third sections;

a first pair of outriggers including a first front beam member and a first rear beam member connected to and transversely extending from the second pair of side rails, each of the first front and rear beam members having distal ends positioned outwardly from the second pair of side rails such that a top surface of the first front and first rear beam members lie in a plane defined by the top surface of the second pair of side rails and a first mounting platform disposed on each distal end such that a first mounting platform elevation is greater than the second section elevation but less than the first section elevation, wherein the first mounting platforms are configured to support a first of said filled proppant containers;

a second pair of outriggers including a second front beam member and a second rear beam member connected to and transversely extending from the second pair of side rails proximate the first pair of outriggers, each of the second front and rear beam members having distal ends positioned outwardly from the second pair of side rails such that a top surface of the second front and rear beam members lie in the plane defined by the top surface of the second pair of side rails and a second mounting platform disposed on each distal end such that a second mounting platform elevation is greater than the second section elevation but less than the first section elevation, wherein the second mounting platforms are configured to support a second of said proppant containers in the side-by-side arrangement; and at least three wheel and axle assemblies positioned subjacent to the first pair of side rails and rearward of the second pair of side rails, each wheel and axle assembly including a plurality of wheels rotatably connected to an axle to enable rolling movement of the frame.

2. The trailer assembly of claim 1, wherein each distal end portion of the first front and rear beam members includes a first proppant container coupling element positioned adjacent each distal end portion thereof to engage and secure the first proppant container, and wherein each distal end portion of the second front and rear beam members includes a second proppant container coupling element positioned at each distal end portion thereof to engage and secure the second proppant container.

3. The trailer assembly of claim 2, wherein the first front beam member and the second rear beam member are integrally formed to provide a dual outrigger positioned at a medial portion of the frame.

4. The trailer assembly of claim 3, wherein each of the proppant container coupling elements comprises a locking mechanism to secure the first or second proppant containers to a top surface of the dual outrigger.

5. The trailer assembly of claim 4, wherein each of the locking mechanisms comprises a lever positioned to rotate a body portion of the locking mechanism to engage the first or second proppant container so as to secure the proppant container to the top surface of the dual outrigger.

6. The trailer assembly of claim 1, the first section further comprising a plurality of support beams positioned transverse the first pair of side rails and arranged so as to provide structural support to the three or more wheel and axle assemblies and to distribute the load among the three or more wheel and axle assemblies.

7. The trailer assembly of claim 1, further comprising a jack connected to the connector section, the jack having a retractable leg that is movable between an in position and an out position, to provide support and stability to the trailer assembly when the trailer assembly is stationary and when the jack is in the out position.

8. The trailer assembly of claim 1, wherein a cross-sectional shape of each of the first pair of outriggers and the second pairs of outriggers comprises a first width of a bottom surface of the outrigger and a second width of a top surface of the outrigger, wherein the first width is greater than or equal to the second width so as to distribute and stabilize the load over a larger surface area.

* * * * *